United States Patent
Lin et al.

(10) Patent No.: US 11,966,783 B1
(45) Date of Patent: Apr. 23, 2024

(54) REAL TIME SCHEDULING USING EXPECTED APPLICATION RESOURCE USAGE

(71) Applicant: Sync Computing Corp., Cambridge, MA (US)

(72) Inventors: Erica Lin, Cambridge, MA (US); Jeffrey Chou, Boston, MA (US); Suraj Bramhavar, Arlington, MA (US); Titash Rakshit, Austin, TX (US); Jeffrey G. Bernstein, Middleton, MA (US)

(73) Assignee: Sync Computing Corp., Cambridge, MA (US)

( * ) Notice: Subject to any disclaimer, the term of this patent is extended or adjusted under 35 U.S.C. 154(b) by 427 days.

(21) Appl. No.: 17/402,432

(22) Filed: Aug. 13, 2021

Related U.S. Application Data

(60) Provisional application No. 63/070,168, filed on Aug. 25, 2020, provisional application No. 63/067,195, filed on Aug. 18, 2020, provisional application No. 63/066,774, filed on Aug. 17, 2020.

(51) Int. Cl.
    *G06F 3/00* (2006.01)
    *G06F 9/48* (2006.01)
    *G06F 9/50* (2006.01)

(52) U.S. Cl.
    CPC .......... *G06F 9/5038* (2013.01); *G06F 9/4881* (2013.01)

(58) Field of Classification Search
    CPC ....................................................... G06F 9/455
    See application file for complete search history.

(56) References Cited

U.S. PATENT DOCUMENTS

| | | | |
|---|---|---|---|
| 11,201,794 B1* | 12/2021 | Guo | H04L 43/0864 |
| 2011/0202926 A1* | 8/2011 | Chambliss | G06F 9/5038 718/104 |

(Continued)

FOREIGN PATENT DOCUMENTS

| | | | | |
|---|---|---|---|---|
| CA | 3154554 A1 * | 3/2021 | ......... | H04L 27/0006 |
| CN | 100373344 C * | 3/2008 | ........... | G06F 9/5016 |

(Continued)

OTHER PUBLICATIONS

David Lo, Heracles: Improving Resource Efficiency at Scale. (Year: 2015).*

(Continued)

*Primary Examiner* — Lechi Truong
(74) *Attorney, Agent, or Firm* — Van Pelt, Yi & James LLP

(57) ABSTRACT

A method of assigning processing resources is described. The method includes receiving an application and analyzing the application to determine an expected run time use of the processing resources. At least a portion of the processing resources are assigned to the application based on the expected run time use of the processing resources. A computing system architecture including a processing resource pool, an interface, and a special purpose optimization coprocessor is also described. The interface receives an application to be executed. The special purpose optimization coprocessor receives information about the application and the processing resource pool and outputs an allocation scheme for allocating tasks of the application to the processing resource pool.

18 Claims, 13 Drawing Sheets

(56) References Cited

U.S. PATENT DOCUMENTS

| | | | |
|---|---|---|---|
| 2011/0239010 A1* | 9/2011 | Jain | G06F 1/3209 |
| | | | 713/310 |
| 2013/0160011 A1* | 6/2013 | Corrie | G06F 9/45558 |
| | | | 718/1 |
| 2017/0359156 A1* | 12/2017 | Jöngren | H04W 72/20 |
| 2019/0342379 A1* | 11/2019 | Shukla | G06F 16/219 |
| 2021/0141708 A1* | 5/2021 | Mathur | G06F 11/323 |
| 2023/0337047 A1* | 10/2023 | Mehta | H04W 28/0268 |

FOREIGN PATENT DOCUMENTS

| | | | | |
|---|---|---|---|---|
| CN | 103678075 A | * | 3/2014 | |
| CN | 112099956 A | * | 12/2020 | |
| WO | WO-9954833 A2 | * | 10/1999 | G06F 17/30595 |

OTHER PUBLICATIONS

Verma et al. Large-scale cluster management at Google with Borg. In Proceedings of the European Conference on Computer Systems (EuroSys), Bordeaux, France, 2015.

Zaharia et al., Delay Scheduling: A Simple Technique for Achieving Locality and Fairness in Cluster Scheduling, EuroSys'10, Apr. 13-16, 2010, ACM.

\* cited by examiner

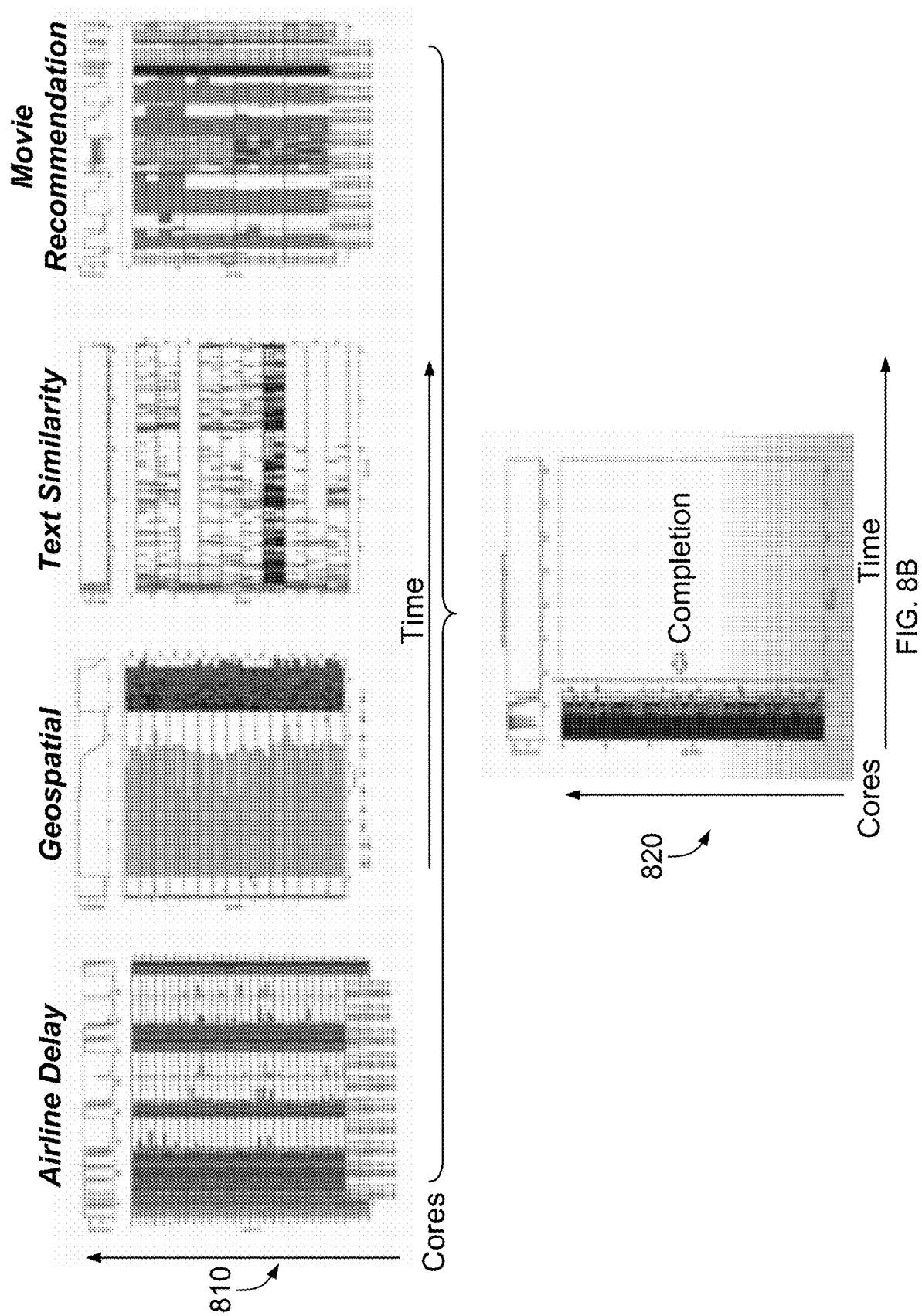

Programmable Compute Unit (PCU)

REAL TIME SCHEDULING USING EXPECTED APPLICATION RESOURCE USAGE

CROSS REFERENCE TO OTHER APPLICATIONS

This application claims priority to U.S. Provisional Patent Application No. 63/067,195 entitled THREAD PINNING OPTIMIZATION filed Aug. 18, 2020, U.S. Provisional Patent Application No. 63/066,774 entitled REALTIME SCHEDULER FOR DATA CENTER/CLOUD PERFORMANCE, COST AND POWER OPTIMIZATION filed Aug. 17, 2020, and U.S. Provisional Patent Application No. 63/070,168 entitled PROGRAMMABLE SCHEDULING HARDWARE ACCELERATOR filed Aug. 25, 2020, all of which are incorporated herein by reference for all purposes.

BACKGROUND OF THE INVENTION

Scheduling of tasks performed for an application is a large, complex problem that rapidly increases in complexity for larger numbers of tasks and more processing resources. In an integrated circuit including sixty-four processing cores, for example, there may be $10^{89}$ possible combinations of assignments of a given number of threads to the cores. Thus, scheduling tasks (e.g. pinning of threads) of an application to cores in a multi-core system may consume a large amount of time and resources. This problem is exacerbated for larger numbers of tasks (e.g. multiple applications, each of which utilizes multiple tasks) and for more computing services (e.g. multiple servers, each of which may utilize multiple cores, memory resources, and networking resources). The scheduling and mapping of compute jobs (i.e. applications, each of which includes multiple tasks) to available processing, network, memory and disk resources in the cloud or on on-premises datacenters (DC) is an NP-hard optimization problem. Thus, the problem of optimally assigning applications to processing resources explodes exponentially with larger numbers of jobs as well as with more processing resources. Solving for the scheduling in an optimal/close-to-optimal fashion may take an extremely long time. This may lead to latency degradation, wasted resources, high cost and high power consumption. Consequently, simple, heuristic scheduling mechanisms are typically used. For example, a Linux scheduler, called the completely fair scheduler (CFS), attempts to distribute tasks uniformly across processing resources. Thus, tasks for a single application running on a single, multicore system may be scheduled uniformly (e.g. randomly) across the cores of the system. Stated differently, threads are assigned randomly to cores of the system. Similarly, tasks for multiple applications to be run on multiple servers may be scheduled uniformly across the servers. Although this strategy is fast and may be acceptable for some tasks, it may result in a sub-optimal use of computing resources leading to poor performance and higher power consumption.

Some conventional schedulers allow users to specify the processing resources required for their applications' tasks. The scheduler then distributes the applications' tasks evenly to the specified processing resources. When utilizing such schedulers, users may request more processing resources than actually needed by their application. In addition to a sub-optimal distribution of processing resources, therefore, the scheduler may over-allocate processing resources to certain applications. This may further degrade performance as well as increase the cost for the end user. Still other schedulers may use the simple heuristic of checking nearby cores to determine if the cores are busy. If all nearby cores are busy, the scheduler may wait a preset time (e.g. five milliseconds) and recheck to determine if a nearby core is free. If the nearby core is free, the task is scheduled for the nearby core. If a nearby core is not free, then the task is randomly scheduled on another core in the system. Although sufficiently fast, such a mechanism may still result in poor allocation of resources due to its simplicity. Consequently, techniques for improving the distribution of resources in computing systems such as multicore systems or multi-server systems are desired.

BRIEF DESCRIPTION OF THE DRAWINGS

Various embodiments of the invention are disclosed in the following detailed description and the accompanying drawings.

FIGS. 8A-8B indicate the improvement in resource use when tasks scheduling is optimized.

DETAILED DESCRIPTION

Figure 1:
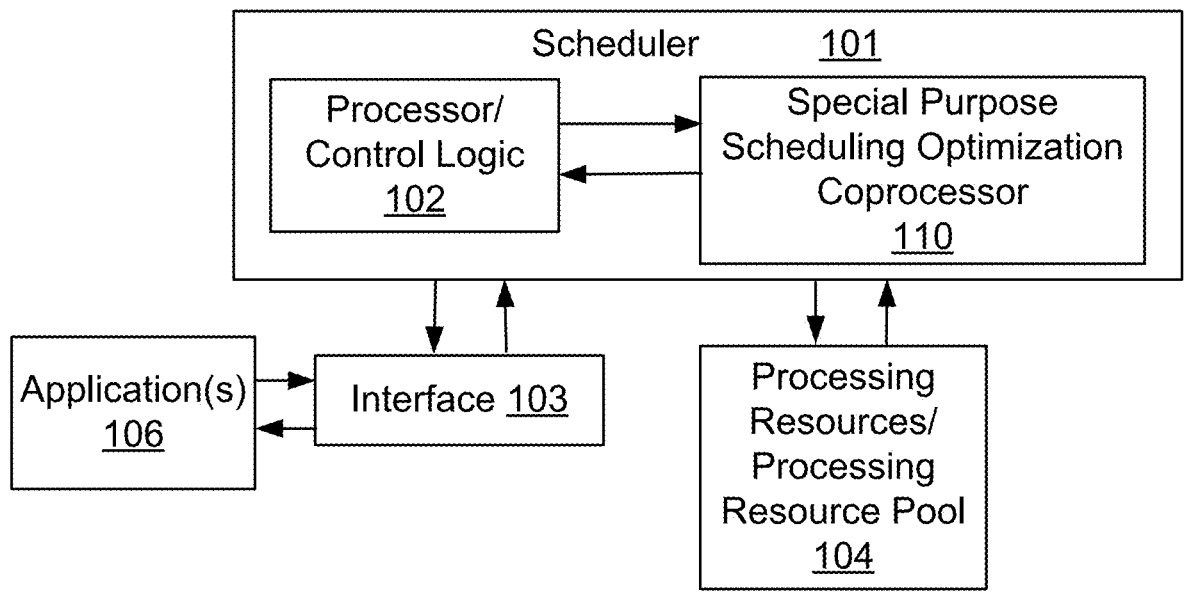
FIG. 1 depicts an embodiment of a computing system architecture utilizing a special purpose optimization processor for performing scheduling.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of assigning processing resources is described. The method includes receiving an application and analyzing the application to determine an expected run time use of the processing resources. At least a portion of the processing resources are assigned to the application based on the expected run time use of the processing resources. In some embodiments, the application includes tasks to be performed. Analyzing the application further includes determining a number of the tasks, determining an order of the tasks, and determining an information transfer between tasks. The expected runtime use of processing resources may include an estimated time for each task to be completed.

In some embodiments, multiple applications are received and analyzed. The analysis determines, for each of the applications, the expected run time use of the processing resources. In such embodiments, includes assigning at least the portion of the processing resources to each application based on the expected run time use of the processing resources for each application. The processing resources may include a plurality of cores. In such embodiments, analyzing the processing resources further includes determining latencies between the cores and determining resource contention costs for each of the plurality of cores. In such embodiments, the assigning of processing resources is accomplished using a dedicated optimization coprocessor that receives the mapping of the expected run time use of the processing resources and outputs a solution to the optimization problem. The solution corresponds to an assignment of at least the portion of the processing resources.

A computing system architecture includes a processing resource pool, an interface, and a special purpose optimization coprocessor. The interface receives an application to be executed. The special purpose optimization coprocessor receives information about the application and the processing resource pool and outputs an allocation scheme for allocating tasks of the application to the processing resource pool. In some embodiments, the special purpose optimization coprocessor further includes digital oscillators and at least one programmable interconnect. The programmable interconnect(s) are configured to provide weights for and to selectably couple at least a portion of the digital oscillators.

In some embodiments, the computing system architecture further includes a processor. The processor is configured to analyze the application to determine an expected run time use of the processing resource pool. The information received by the special purpose optimization coprocessor further includes the expected run time use of the processing resource pool. To analyze the application, the processor may be configured to determine a number of the tasks, determine an order of the tasks, and determine an information transfer between the tasks. In some embodiments, the processor is further configured to map the information about the application and the processing resource pool to an optimization problem.

The interface may receive multiple applications. In such embodiments, the allocation scheme output by the special purpose optimization coprocessor allocates the tasks of each of the applications to the processing resource pool. The interface may receive the applications in a time interval. In some such embodiments, the special purpose optimization coprocessor continuously updates the allocation scheme in the time interval. In some embodiments, the special purpose optimization coprocessor outputs the allocation scheme for the applications received in the time interval.

The processing resource pool may include cores. In such embodiments, the special purpose optimization coprocessor outputs the allocation scheme based on latencies between the cores and resource contention costs for each of the cores. In some embodiments, the processing resource pool includes servers. In such embodiments, the special purpose optimization coprocessor outputs the allocation scheme based on latencies within each of the servers and between the servers and based on resource contention costs for each of the servers.

A computer program product embodied in a non-transitory computer readable medium is also described. The computer program product includes computer instructions for receiving an application and analyzing the application to determine an expected run time use of a processing resource pool by the application. In some embodiments, the processing resource pool includes cores in a server and memory resources for the cores. The computer program product also includes instructions for providing, to a special purpose optimization coprocessor, information about the expected run time use of the processing resource pool. The special purpose optimization coprocessor outputs an allocation scheme for allocating tasks of the application to the processing resource pool based on the expected runtime use of the processing resource pool. The computer program product also includes computer instructions for assigning the tasks of the application using the allocation scheme.

In some embodiments, multiple applications are received. The applications are analyzed to determine the expected run time use of the processing resource pool for each the applications. The expected runtime use of the processing resource pool for each of the applications is provided to the special purpose optimization processor. The allocation scheme allocates the tasks of each of the plurality of applications to the processing resource pool based on the expected runtime use for each application.

FIG. 1 depicts an embodiment of computing system architecture 100 utilizing special purpose optimization processor (SPOC) 110 for performing scheduling for one or more application(s) 106. System 100 includes scheduler 101, interface 103, and computing resource (otherwise termed processing resource pool) 104. Scheduler 101 includes SPOC 110 and, in the embodiment shown, processor 102. In some embodiments, scheduler 101 may also include memory (not shown). Processor 102 may simply be control logic, an FPGA, a CPU and/or a GPU used in controlling SPOC 110. In some embodiments, processor 102 might be omitted. In other embodiments, multiple processors may be used. Similarly, although a single SPOC 110 is shown, in some embodiments, scheduler 101 may include multiple SPOCs 110.

Processing resources 104 may include one or more servers (or other computing systems) each of which includes multiple cores, memory resources, disk resources, networking resources, and/or other computing components used in implementing tasks for executing application(s) 106. In some embodiments, for example, processing resources 104 may include a single server (or other computing system) having multiple cores and associated memory and disk resources. In some embodiments, processing resources 104 may include multiple servers, networking resources for the servers, and memory and disk resources for the servers. Interface 103 receives the application(s) 106 to be executed. Application(s) 106 include one or more applications each of which includes multiple tasks to be performed by processing resources 104.

SPOC 110 receives information about application(s) 106 and information about processing resource pool 104. The information about application(s) 106 received by SPOC 110 may include the number of the tasks in application 106, the order in which the tasks are to be performed (i.e. which tasks have to be completed before other tasks), the data transferred between the tasks of application 106 (e.g. the amount and frequency of data transfer between tasks), and/or other characteristics of the tasks in application 106. The information related to the tasks may be used to determine the expected runtime usage of processing resources 104. For example, the estimated time to complete each of the applications' tasks may be determined. In some embodiments, processor 102 analyzes application(s) 106 to determine the information (e.g. expected runtime use of processing resources 104) related to the application 106. In other embodiments, interface 103 analyzes application(s) 106 to obtain this information. In some embodiments, processor 102 and interface 103 may cooperate to analyze the applications. This information related to the application is provided to SPOC 110.

The information related to application(s) 106 may be obtained by determining the protocol used by the application and querying particular sections of application(s) 106 based on the protocol. For example, some applications (e.g. used for fluid dynamics problems) may utilize message passing interface (MPI). For Apache Spark applications, the protocol used is a resilient distributed dataset (RDD). Information related to the application may be obtained from the RDD. Other protocols may be used by application(s) 106. Based on the protocols used, the information related to the application 106 may be obtained from the appropriate portion of the application 106. The completion times of tasks for application(s) 106 as a function of processing resources 104 may be estimated by processor 102 based on the information obtained based on the protocol.

The information related to processing resources 104 received by SPOC 110 may include latencies between the cores in processing resources 104 and resource contention costs for each of the cores in processing resources 104. In some embodiments, this information is obtained once (or at scheduled intervals) by querying processing resources 104. For example, each core in processing resources 104 has latencies (e.g. how quickly the core can communicate with another core) associated with it. Each core also has a specified amount of nearby (e.g. local) memory that may have characteristic access times. Each core also has particular amounts of memory located at other distances and thus which have other latencies. This information related to processing resources 104 may be obtained by querying each core. Other information, for example, for networking resources, may be obtained in an analogous manner. In some embodiments, the information related to processing resources 104 may be expressed as a latency matrix for processing resources 104. Similarly, resource contention costs (e.g. latencies due to multiple cores in a server accessing the same local or other memory) may be obtained in a similar manner and expressed as a matrix. In some embodiments, processor 102 queries processing resources 104 and provides such a matrix or matrices.

SPOC 110 determines the allocation of processing resources 104 based on the information provided for the application 106 and processing resources 104. For example, SPOC 110 may use estimates of the completion times of tasks (e.g. task latencies) for application(s) 106 and/or other the information related to application(s) 106 and information about processing resources 104 to determine how processing resources 104 should be assigned. SPOC 110 and thus scheduler 101 also provide an optimized allocation scheme for allocating tasks of application(s) 106 to processing resources 104. This optimized allocation scheme takes into account the characteristics of application(s) 106 (e.g. information related to the tasks). The optimized allocation scheme may also take into account information related to processing resources 104, such as the latencies and resource contention costs. Thus, resources may be better allocated to application(s) 106, resulting in faster, more efficient execution of application(s) 106. Thus, performance of computer system 100 may be improved. Further, computing costs for application(s) 106 may be reduced. Moreover, SPOC 110 provides the optimized allocation of processing resources in real time (e.g. within hundreds of milliseconds in some embodiments, within tens of milliseconds in some such embodiments, and within less than ten milliseconds in some embodiments). Thus, an improved allocation of resources may be obtained without unduly delaying scheduling of application(s) 106.

In some embodiments, the SPOC 110 includes digital oscillators and programmable interconnect(s). The programmable interconnect(s) are configured to provide weights for and to selectably couple at least some of the digital oscillators. As SPOC 110 determines the expected run time use of processing resources 104 and the optimized allocation scheme for assigning processing resources and tasks of application(s) 106, the weights may be updated. An embodiment of SPOC 110 is described below.

Figure 2:
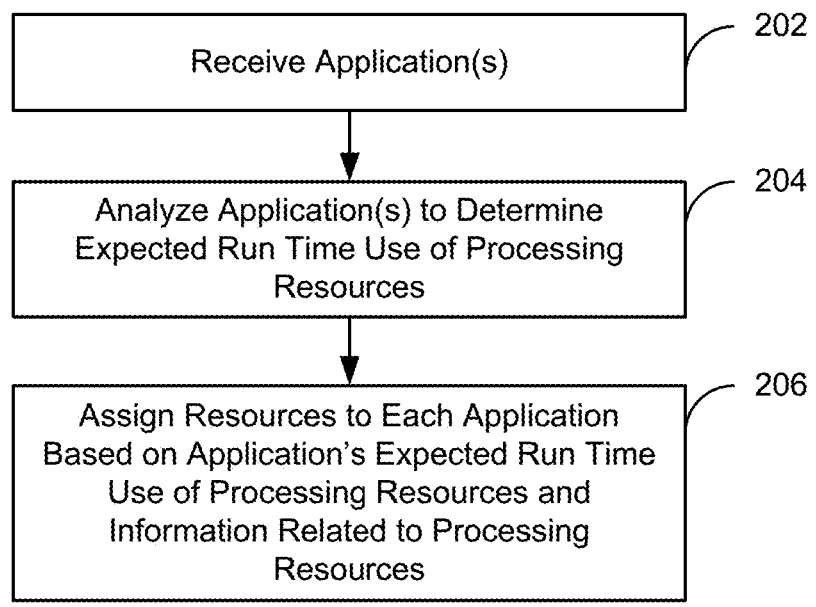
FIG. 2 depicts an embodiment of a method for scheduling computing tasks.

FIG. 2 depicts an embodiment of method 200 for scheduling computing tasks. Method 200 may be used in conjunction with system 100. However, in other embodiments, method 200 may be utilized with other systems. Although certain processes are shown in a particular order for method 200, other processes and/or other orders may be utilized in other embodiments.

One or more applications are received, at 202. An application includes multiple tasks that may be interrelated. For example, some tasks may require information from other tasks. Further, some tasks may require the commencement or completion of other task(s) or portion(s) thereof. The application(s) are analyzed to determine an expected run time use of the processing resources, at 204. For example, the number of the tasks for each application, the order of the tasks in the application(s), and the information transfer (e.g.

frequency, timing, and/or amount of information transfer) between tasks may be determined at 204. In some embodiments, the expected time to complete individual tasks may be estimated at 204. For example, a task latency matrix for each application may be determined.

In some embodiments, 204 also incorporates information related to the processing resources into the mapping of the optimization problem. For example, the latency and resource contention costs may be provided at 204. In some embodiments, these costs are known for the processing resources being allocated. This may include providing a latency matrix and/or a resource contention cost matrix for the processing resources to be allocated. In some embodiments, a single matrix incorporating characteristics such as latency and/or resource contention costs may be used. In some embodiments, the analysis at 204 includes mapping the information related to the tasks (i.e. the expected runtime use of processing resources) to an optimization problem.

Processing resources are assigned to each application based on the expected run time use of the processing resources (e.g. based on the task latency matrix), at 206. In some embodiments, 206 also assigns processing resources to each application based on information related to the processing resources (e.g. the processing resource latency matrix and/or the resource contention cost matrix). Thus, 206 may include solving the optimization problem based on the characteristics of the processing resources and the features of the tasks for the application(s). An optimized run time use of processing resources and, therefore, how processing resources should be assigned to efficiently use processing resources may be achieved. Thus, processing resources may be allocated to tasks of application(s) based on features of the applications themselves as well as based on the processing resources.

In some embodiments, method 200 may be performed for a single application. In embodiments in which method 200 is performed for multiple applications, the applications may be received at substantially the same time or over a time interval. In such embodiments, method 200 may be continuously or periodically performed to allocate and/or reallocate processing resources to the applications that have been received. In some embodiments, method 200 may be performed for batches of applications. For example, processing resources for up to a particular number (including all) applications received in a time interval may be allocated together using method 200.

For example, one or more application(s) 106 may be received at interface 103, at 202. At 204, the application(s) may be analyzed by interface 103 and/or processor 102 to determine the number of tasks, relationship between the tasks (e.g. the order), and/or the information transfer between the tasks. The expected runtime use of processing resources for each task (e.g. the expected time for completion) may be estimated. In some embodiments, a task latency matrix for the application(s) can be determined using processor 102 and/or interface 103. The expected runtime use of processing resources and, in some embodiments, information related to the processing resources are provided to SPOC 110. For example, task latency information, processing resource latency information, and resource contention cost information may be provided to SPOC 110. Using this information, SPOC 110 determines the allocation of processing resources to tasks, at 206. Processing resources 104 may be assigned to tasks based on this allocation.

Using method 200, processing resources may be better allocated to one or more applications. As a result, the time taken to perform the tasks (i.e. to execute the application(s)) may be dramatically reduced. The compute costs for executing the applications depend upon the number of cores and time taken to complete execution by the cores. By better allocating resources, the compute costs may also be significantly reduced. Further, through the use of SPOC 110, this may be achieved in real time, without significantly adding to the time taken to execute the applications. Thus, efficiency, costs, and allocation of resources may be greatly improved.

Figure 3A:
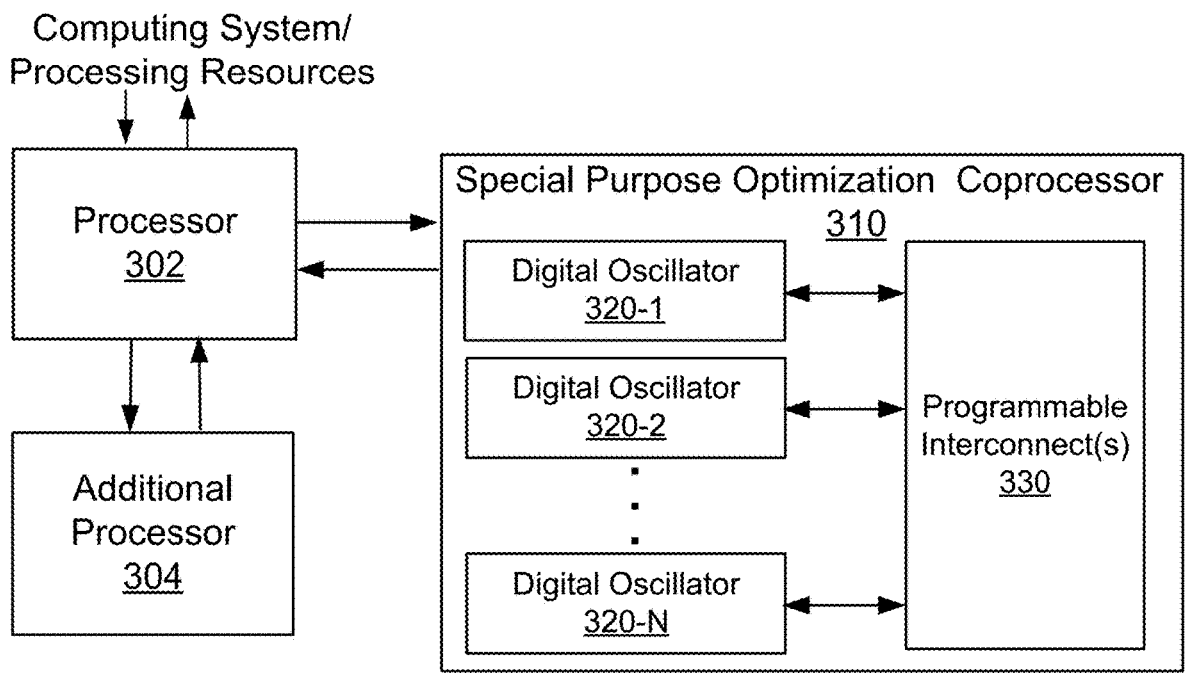
FIGS. 3A-3C depicts an embodiment of a scheduler utilizing a special purpose optimization processor.
Figure 3B:
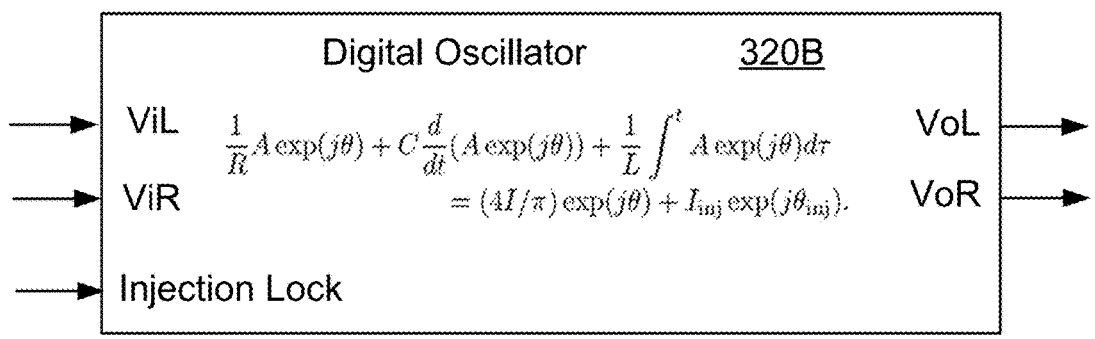
Figure 3C:
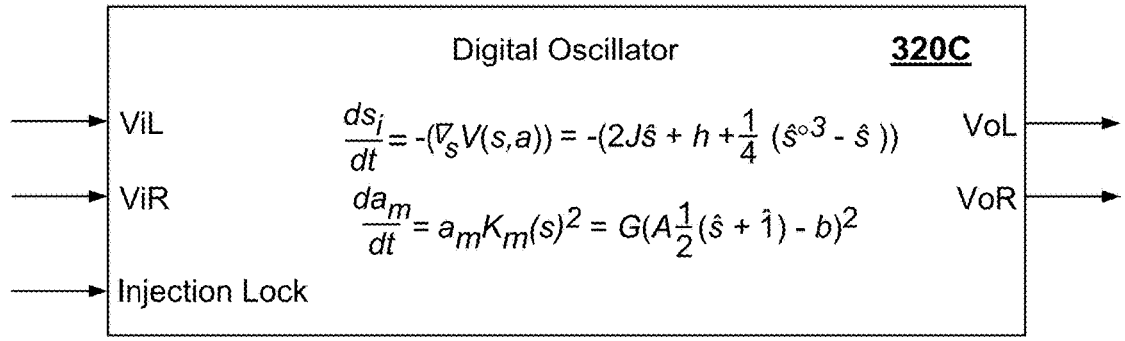

Scheduler 101 and SPOC 110 may be used to improve resource allocation. FIGS. 3A-3C are block diagrams depicting an embodiment of scheduling system 300. Scheduling system 300 may be considered an embodiment of scheduler 101 of FIG. 1. FIG. 3A depicts system 300 including special purpose optimization coprocessor (SPOC) 310. FIG. 3B depicts an embodiment of digital oscillator 320B usable in SPOC 310. FIG. 3C depicts another embodiment of digital oscillator 320C usable in SPOC 310. System 300 is usable in scheduling compute tasks and/or other allocation of processing resources. For example, system 300 may be used in scheduling tasks (e.g. thread pinning/task scheduling for one or more applications) for a single multicore system. System 300 may also be used in scheduling tasks (e.g. tasks for one or more applications) in a system including multiple servers, each of which may include multiple cores. For clarity, only certain components of system 300 are depicted. System 300 includes processors 302 and 304 in addition to SPOC 310. Although system 300 is described in the context of a single SPOC 310, system 300 may include multiple SPOCs. Although multiple processors 302 and 304 are shown, in some embodiments, another number (including a single processor) may be used. In some embodiments, processor 302 and/or processor 304 may be omitted. Processor(s) 302 and/or 304 may be a CPU, a GPU, a special purpose processor such as an FPGA or ASIC, or another type or processor. Further, in the case of multiple SPOCs, all SPOCs can, but need not, be configured in a manner analogous to SPOC 310. SPOC 310 may also be considered to be an optimization processing unit utilized to solve a complex problem.

Processor 302 may be used to carry out various functions associated with scheduling (i.e. optimization processing in the context of resource allocation). Processor 302 may read and decode instructions and offload at least some of its work to SPOC 310. In some embodiments, processor 302 can itself perform some of the scheduling. More specifically, processor 302 might be used for solving simpler scheduling problems defined in a classical manner e.g. as a linear programming solution. The scheduling problem itself can be partitioned into a classical part and an SPOC part. In one embodiment, the classical part can be solved using processor 302 and the SPOC part can be solved using an SPOC 310, processor 304 and/or FPGA(s) (not shown in FIGS. 3A-3C). The part of the problem that is to be partitioned between various units (e.g. processor 302, processor 304 and/or SPOC 310) can be defined by a user through a programmable interface (not shown in FIG. 3A). The user can choose to partition the workload related to solving the scheduling problem between processor 302, processor 304, and/or SPOC 310. Partitioning the problem into classical versus stochastic computing parts is also programmable. Thus, the systems and techniques described herein are programmable, e.g. by the user. In some embodiments, processor(s) 302 and/or 304 are used in mapping scheduling problems to SPOC 310. Processor(s) 302 and/or 304 may be used in analyzing application(s) received for scheduling (e.g. in determining the task latency matrix) and/or querying processing resources to determine information related to processing resources used in scheduling (e.g. determining the processing resource latency matrix and/or the resource contention cost matrix).

SPOC 310 includes programmable interconnect 330 and digital oscillators 320-1, 320-2 through 320-N (collectively digital oscillators 320/generically digital oscillator 320). For simplicity, SPOC 310 is described in the context of a single programmable interconnect 330. However, in some embodiments, multiple programmable interconnects are present. N digital oscillators 320 capable of functioning in parallel are shown. In FIG. 3A, digital oscillators 320 are shown as the same. However, in other embodiments, digital oscillators 320 may differ.

Programmable interconnect 330 is configured to provide weights for and to selectably couple some or all of digital oscillators 320. For example, results sampled from a particular digital oscillator 320 are weighted and provided to some or all of the remaining digital oscillators 320 via programmable interconnect 330. In some embodiments, programmable interconnect 330 fully connects digital oscillators 320. In such a case, each digital oscillator 320 is coupled with all other digital oscillators 320 in SPOC 310. In some embodiments, programmable interconnect 330 sparsely connects digital oscillators 320. In this case, each digital oscillator 320 is connected with a subset of the remaining digital oscillators 320. In some embodiments, the connections between digital oscillator(s) 320 are reconfigurable and, therefore, not fixed in hardware. In other embodiments, the digital oscillator(s) 320 that are coupled via programmable interconnect 330 are fixed. Programmable interconnect 330 may be or include a digital matrix multiplier. Such a digital matrix multiplier may be implemented via an FPGA, GPU, and/or an application specific integrated circuit (ASIC). Thus, programmable interconnect 330 may be viewed as weighting and mixing signals from digital oscillators 320 and providing weighted, mixed signals as inputs to one or more other digital oscillators 320. In some embodiments, programmable interconnect 330 may perform additional functions. For example, some calculations for digital oscillators 320 may be offloaded to programmable interconnect 330.

In some embodiments, digital oscillators 320 digitally model periodic (or wave) functions and/or the corresponding systems. More generally, digital oscillators 320 model a system governed by one or more differential equations. Stated differently, a digital oscillator 320 may be a differential equation solver for a periodic differential equation and/or a differential equation solver for the differential equation(s) governing particular systems. For example, a digital oscillator 320 may model an analog oscillator, such as an inductive-capacitive (LC) or resistive-inductive-capacitive (RLC) circuit. Such a digital oscillator 320 may be viewed as solving the differential equation for an LC or RLC circuit. A digital oscillator 320 may model Schrodinger's equation (i.e. the differential equation related to the Hamiltonian) of an electron. Thus, digital oscillator 320 may solve Schrodinger's (differential) equation to find the ground states of the electron. Digital oscillator 320 may model the portion of the Ising Hamiltonian for a spin in a system of coupled spins. Stated differently, digital oscillator 320 may be used to model the differential equation (i.e. the Ising Hamiltonian) for a system of coupled spins in which each spin may have a +1 state or −1 state. Thus, digital oscillator 320 may be used to model a particular system governed by differential equations.

Similarly, digital oscillator 320 may be viewed as solving differential equations that can be used to solve particular problems. As discussed above, some scheduling problems may be solved via digital oscillators configured to solve differential equations. Similarly, satisfiability problems, such as Boolean satisfiability problems (k-SAT problems), may be described by differential equations. A k-SAT problem has a set of Boolean variables and conditions related to the variables. The conditions relate to the values taken by subsets of the Boolean variables. Using the method proposed by Maria Ercsey-Ravasz, et al., the k-SAT problem can be described by an energy function. It has been determined that the energy function can be generalized and mapped to an Ising model. It has also been determined that this model is governed by a particular set of differential equations. Moreover, such a k-SAT problem, and the differential equations governing the problem, correspond to an optimized solution to a scheduling problem. Thus, digital oscillators 320 may also be used in solving differential equations to which scheduling problems have been mapped.

Digital oscillator 320 may employ various mechanisms including but not limited to Euler's method and the Kuramoto model to solve such differential equations. In some embodiments, digital oscillator 320 includes or consists of digital circuit components that are utilized at temperatures at or above zero degrees Celsius (e.g. room temperature or above). In some embodiments, digital oscillators 320 may include or consist of circuit components formed on silicon wafers as part of an integrated circuit. Thus, digital oscillators 320 include digital circuit components which are connected and configured to solve the corresponding differential equations using a mechanism such as Euler's method and/or the Kuramoto model.

The combination of digital oscillators 320 coupled via programmable interconnect 330 digitally models coupled differential equations, coupled periodic functions and/or the corresponding coupled systems. Coupled together via programmable interconnect 330, digital oscillators 320 may be viewed as functioning substantially in parallel to digitally solve a set of coupled differential equations. For example, coupled digital oscillators 320 may be used to model the Ising Hamiltonian used to solve scheduling problems. Thus, digital oscillators 320 coupled via programmable interconnect 330 may model systems having nodes coupled in accordance with the Ising model. In some embodiments, SPOC 310 (i.e. digital oscillators 320 in combination with programmable interconnect 330) models a system of coupled analog oscillators, such as coupled LC circuits and/or coupled RLC circuits. Thus, SPOC 310 may solve the differential equations governing a set of coupled LC and/or RLC circuits. In some embodiments, SPOC 310 may solve the differential equations governing the phases of a set of coupled LC and/or RLC circuits. SPOC 310 may be used to model Schrodinger's equations for electrons in a molecule. Electrons in such a molecule interact. Thus, digital oscillators 320 coupled via programmable interconnect 330 solve the differential equations governing the wave functions for interacting (i.e. coupled) electrons in the molecule. SPOC 310 may, therefore, determine the ground states of the electrons in the molecule. In some embodiments, SPOC 310 may solve the differential equations governing the a k-SAT problem, or the Ising Hamiltonian to which a k-SAT problem has been mapped. Thus, digital oscillators 320 in conjunction with programmable interconnect 330 may be used to model a particular system governed by coupled differential equations. Such digital oscillators 320 may employ various mechanisms including but not limited to Euler's method and the Kuramoto model. Digital oscillators 320 are thus configured to provide, based on data input to digital oscillators 320 and weights provided via programmable interconnect 330, responses that are probabilistic and periodic in nature. For example, the responses may be based upon the phases corresponding to digital oscillator 320 at the particular time the oscillator(s) are sampled.

In some embodiments, digital oscillators 320 are injection locked digital oscillators. Injection locked digital oscillators 320 may be more likely to synchronize to reach a stable state for the combination of digital oscillators 320. In some embodiments, each injection locked digital oscillator 320 may settle in one of two states. For example, the phases of the oscillators may be considered to be 0° or 180° and may differ based upon initial conditions for the oscillator and/or the time at which the oscillator is sampled. The phases of these oscillators may be used to model equations, such as the Hamiltonian (e.g. the Ising Hamiltonian) used for some scheduling problems. The phases of these oscillators 320 may also be used to model the corresponding differential equations for the phases of oscillators used in providing a solution to the Ising Hamiltonian. In some embodiments, injection locked digital oscillators are configured by providing injection lock signals to digital oscillators 320. The frequency of such injection lock signals is greater than the frequency of the corresponding digital oscillator 320. In some embodiments, the injection lock signal is at 1.5 multiplied by the frequency and not more than 2.5 multiplied by the frequency of the corresponding digital oscillator 320. For example, in some embodiments, the injection lock signal is at nominally twice the frequency of the corresponding digital oscillator 320. Thus, injection locked digital oscillators 320 may synchronize to provide a stable set of states for digital oscillators 320 coupled via programmable interconnect 330.

FIG. 3B depicts a particular digital oscillator 320B that can be utilized as one or more of digital oscillators 320. In the embodiment shown, digital oscillator 320B is an injection locked digital oscillator. Thus, digital oscillator 320B receives an injection lock signal. In some embodiments, the injection lock signal has a frequency that is nominally twice the modeled oscillator frequency. The injection lock signal assists in syncing digital oscillators 320 to provide the solution to the coupled differential equations (or coupled system) being modeled. Digital oscillator 320B also receives inputs ViL and ViR and provides outputs VoL and VoR. Inputs ViL and ViR correspond to weighted inputs provided by programmable interconnect 330 using outputs of other digital oscillators 320. Outputs VoL and VoR are outputs provided by digital oscillator 320B. In some embodiments, digital oscillator 320B is configured to solve a differential equation governing a corresponding analog LC oscillator. Thus, in some embodiments digital oscillator 320B is configured to solve the following equation or its analog:

$$\frac{1}{R} A \exp(j\theta) + C\frac{d}{dt}(A \exp(j\theta)) + \frac{1}{L}\int^\tau A \exp(j\theta)d\tau =$$
$$(4I/\pi)\exp(j\theta) + I_{inj}\exp(j\theta_{inj}).$$

In the above equation, A is a scale factor, C is the capacitance, R is the resistance, L is the inductance, $I_{inj}$ is the amplitude of the injection locking signal, I is the current. Digital oscillator 320B may thus be viewed as modeling a particular oscillating LC circuit that is coupled with other oscillators. In some embodiments, for example, digital oscillator 320B may utilize Euler's method (described herein), the Kuramoto model (described herein) to solve the above differential equation and model the oscillators. In some embodiments, other differential equations may be modeled.

FIG. 3C depicts a particular digital oscillator 320C that can be used as one or more of digital oscillators 320. In the embodiment shown, digital oscillator 320C is an injection locked digital oscillator. Thus, digital oscillator 320C receives an injection lock signal that is analogous to the injection lock signal provided for digital oscillator 320B. The injection lock signal assists in syncing digital oscillators 320 to provide the solution to the coupled differential equations (or coupled system) being modeled. Digital oscillator 320C also receives inputs ViL and ViR and provides outputs VoL and VoR. Inputs ViL and ViR correspond to weighted inputs provided by programmable interconnect 330 using outputs of other digital oscillators 320. Outputs VoL and VoR are outputs provided by digital oscillator 320C. In some embodiments, digital oscillator 320C is configured to solve a differential equation governing a corresponding Ising model to which a k-SAT problem has been mapped. Thus, in some embodiments digital oscillator 320C is configured to solve the following coupled differential equations or their analogs:

$$\frac{ds_i}{dt} = -(\nabla_s V(s,a)) = -\left(2J\hat{s} + h + \frac{1}{4}(\hat{s}^{\circ 3} - \hat{s})\right)$$
$$\frac{da_m}{dt} = a_m K_m(s)^2 = G\left(A\frac{1}{2}(\hat{s} + \hat{1}) - b\right)^2$$

In the above equations, the right side is in matrix/vector form, $s_i$ is the $i^{th}$ Ising spin, am is a term multiplied by the $m^{th}$ constraint, $K_m$ is the $m^{th}$ constraint, V is the energy matrix that depends upon the spins (s) and the constraint terms (a), G is a diagonal matrix including am on its diagonal (where m is the row and column of the matrix) and 0 elsewhere, Ax−b (in matrix form) corresponds to the problem matrix, $s_i$=−1, $\hat{s}^{\circ 3}$ is the s matrix with each element cubed, J and h weights that may be changed. In some embodiments, for example, digital oscillator 320C may utilize Euler's method (described herein), the Kuramoto model (described herein) to solve the above differential equations and, therefore, provide an optimized solution to the k-SAT problem. In some embodiments, other differential equations may be modeled.

System 300 including SPOC 310 may be utilized in solving complex scheduling problems. Digital oscillators 320 operate in parallel. Thus, SPOC 310 may more rapidly and efficiently provide responses to input data. Digital oscillators 320 may be built on silicon and/or run at temperatures well above liquid helium (e.g. above four Kelvin). In some embodiments, digital oscillators 320 are used at temperatures of at least zero degrees Celsius. For example, digital oscillators 320 may operate at or above room temperature (approximately twenty-three degrees Celsius). Consequently, SPOC 310 may be more readily fabricated and utilized than, for example, quantum processors. Because programmable interconnect 330 is reconfigurable, not only can the weight(s) applied be changed, but the digital oscillators 320 to which the weighted responses are applied can be altered. Programmable interconnect 330 creates a much more versatile platform and help address a wider array of scheduling problems, as different applications tend to have different connectivity requirements. This is in stark contrast to both quantum systems which have limited connectivity and alternative digital annealers which aim for full all-all connectivity and as a result have limited size. In addition, the communication between SPOC 310 and remaining components of system 300, such as processor 302 and/or processor 304 may be facilitated and subject to reduced latency than other mechanisms such as quantum computing. Further, use of digital oscillators 320 allows for increased precision in the responses provided by SPOC 310 over analog systems. Moreover, system 300 and SPOC 310 may provide improved solutions to problems, such as the k-SAT problem in a shorter amount of time. Thus, jobs such as scheduling of compute tasks may be performed rapidly (e.g. in real-time or close to real-time) while providing an improved allocation of resources. Thus performance of system 300 may be improved and solutions to complex problems facilitated.

FIGS. 4-8 illustrate scheduling for a multicore system utilizing an embodiment of scheduler 101 and/or 300. Thus, FIGS. 4-8 describe scheduling in the context of thread pinning. Broadly, the scheduling in the context of thread pinning may be broken down into issues with respect to the application(s) for which threads are being scheduled, the hardware/processors, and resources for the hardware. The application utilizes multiple threads (e.g. corresponding to tasks), which may communicate. It is generally desirable to assign threads which have a significant amount of communication to the same core or to the same tile (which includes multiple cores that share resources). In order to do so, the application is scanned to determine the threads used and the communications between threads. This is analogous to 204 of method 200 and to processes discussed for application(s) 106 of computing architecture 100. Thus, the communication behavior for the threads may be determined. To account for scheduling issues with processing resources such as cores, the latencies between the processing resources are determined, for example as described with respect to processing resources 104 of computing architecture 100 and 204 of method 200. The resource contention cost for the threads that share resources are determined. For example, the resource contention costs could include memory contention costs for cores which share the same memory. Thus, threads which utilize a significant amount of memory may be desired to be assigned to cores utilizing different memory resources. In another example, in the case of hyperthreading, when two threads share the same tile, the two threads can benefit from the extremely high bandwidth communication channel on the same tile which can speed up overall performance, however the two threads are also competing for processing resources, which can also slow down the overall performance.

The threads for the application(s) are assigned to the processing resources, such as cores, based upon the communication behavior, the plurality of latencies and the resource contention cost, for example at 206 of method 200. Assigning the threads may include optimizing a combination of the communication between threads with the latencies between processing resources added to the resource contention cost. For example, the costs of communication between threads, core latencies and resource contention are attempted to be minimized. In some embodiments, the optimization may be performed in software, particularly for a smaller number of cores. In some embodiments, the optimization may be performed in hardware. In some embodiments, the optimization is performed in dedicated hardware, for example a field programmable gate array (FPGA) or application specific integrated circuit (ASIC). The optimization may be performed by SPOC 110 and/or 310 depicted in FIGS. 1 and 3A. In some embodiments, the optimization is performed by oscillators. In some embodiments, the oscillators include digital oscillators. In some embodiments, the oscillators include analog oscillators.

Figure 4:
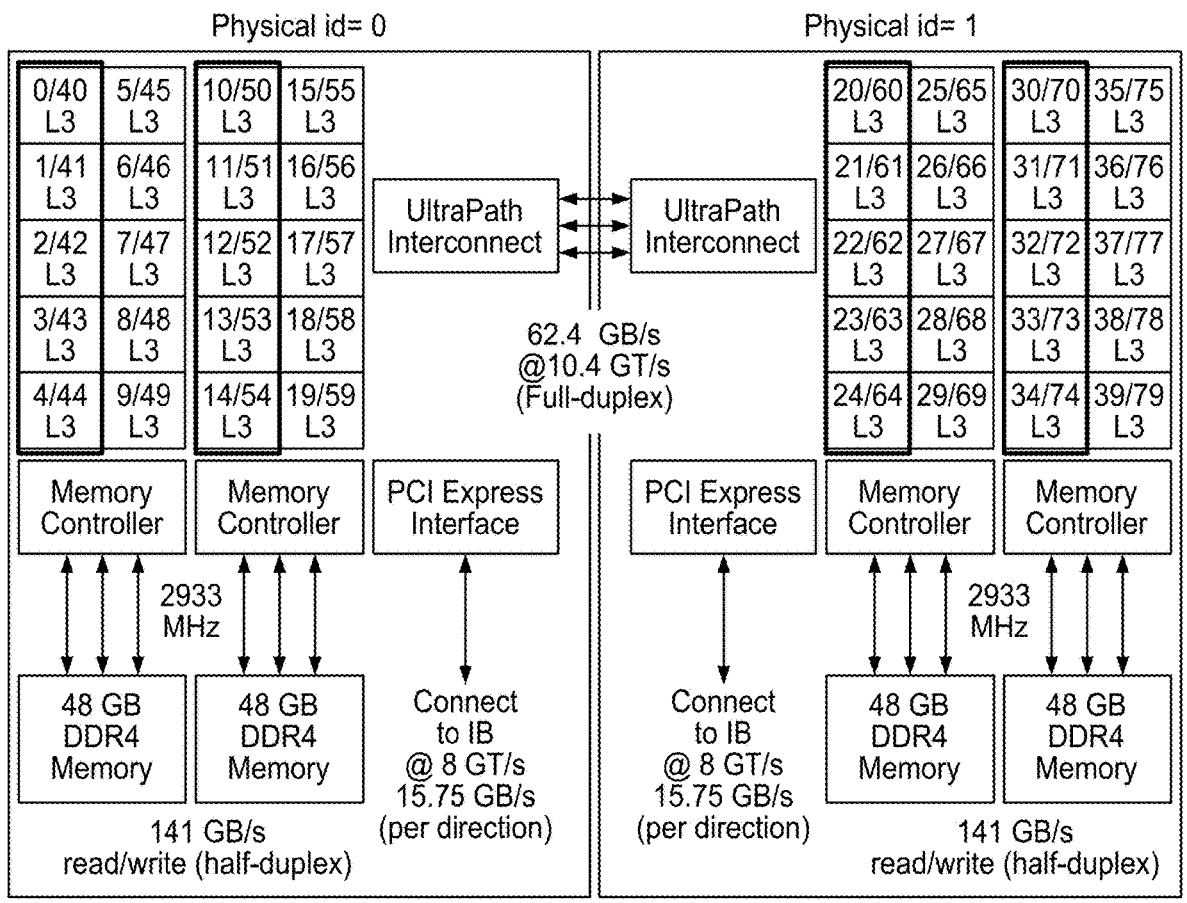
FIGS. 4-5 depict an embodiment of an architecture in which computing tasks are desired to be scheduled using a special purpose optimization coprocessor in the context of thread pinning.
Figure 5:
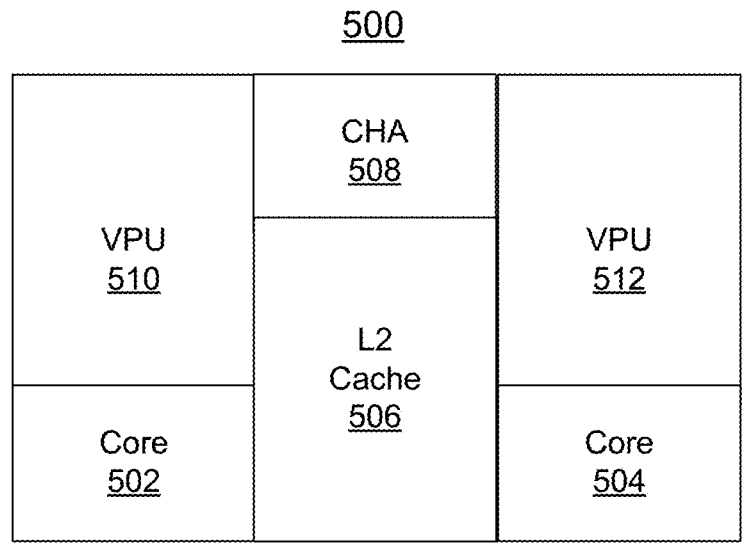

For example, FIG. 4 depicts a configuration of a particular processor 400 for which scheduling is desired to be accomplished. FIG. 5 depicts the arrangement of cores 502 and 504 and their shared resources such as an L2 cache 506 and caching/home agent (CHA) 508 on tile 500. Also shown are vision processing units (VPUs) 510 and 512. The method 200 may be used to determine a communication matrix for communication between threads of the application (corresponding to a determination of the expected runtime use of processing resources at 204), a latency matrix for communication between cores 502 and 504 (corresponding to determining information for processing resources at 204) for each tile 500, and a resource contention cost that indicates penalties for resource contention (e.g. corresponding to determining information for processing resources at 204).

Processor 400 can have N tiles 500, and each tile has 2 CPUs (i.e. cores 502 and 504) in this example. This means there are a total of 2N cores available to do work. The two cores 502 and 504 that are in the same tile 500 share the same L2 cache 506, which may include 1 MB of memory. Sharing the L2 cache 506 is beneficial if two threads on the two neighboring cores 502 and 504 of the tile 500 need to share data and the threads have a very close and high bandwidth link. However, the threads also have to share compute resources. Consequently, the individual computing speed may decrease. As a comparison, two threads on two different tiles (i.e. tile 500 and another tile, not shown, that may be the same as 500) do not share processing resources. In this case, the two threads can leverage all the resources on a single tile for each individual thread.

Figure 6:
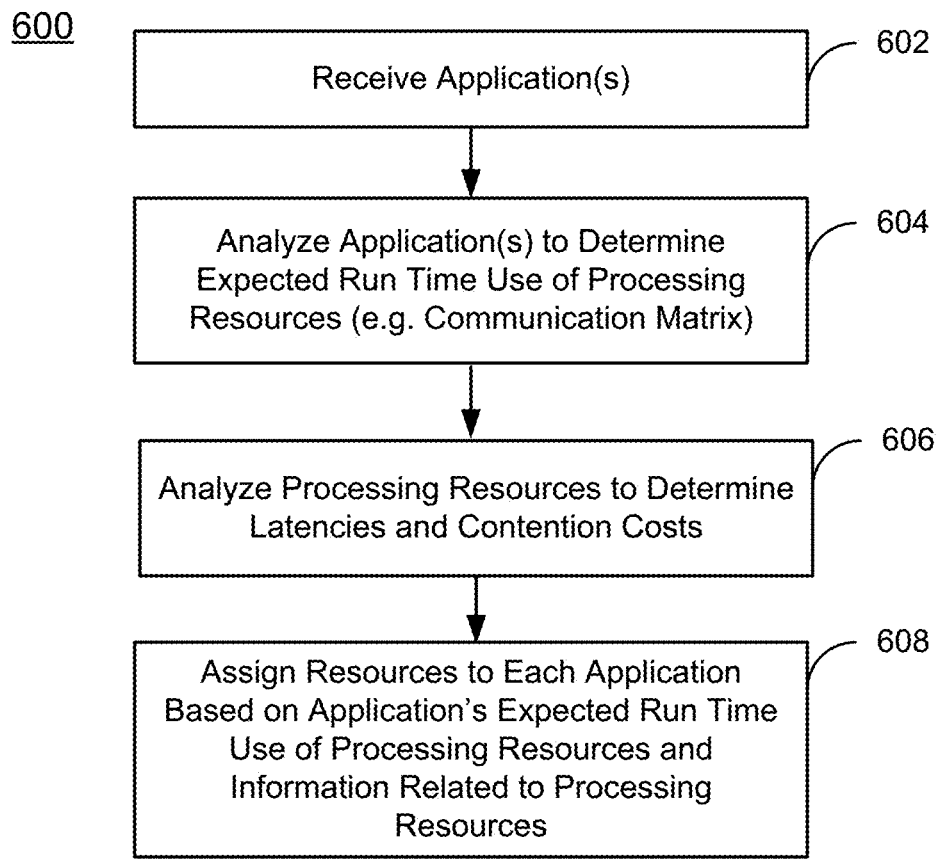
FIG. 6 depicts an embodiment of a method for allocating resources in the context of thread pinning.

FIG. 6 depicts an embodiment of method 600 for allocating resources in the context of thread pinning. Method 600 is described in the context of systems 400 and tiles 500. Although particular processes are shown in a certain order, other processes and/or a different order may be utilized.

The application for which thread pinning is desired to be accomplished is received, at 602. In some embodiments, 602 is analogous to 202 of method 200. To optimize a particular application to a multi-core system 400, a communication matrix may be constructed, at 604. In some embodiments, 602 is analogous to at least part of 202 of method 200. The communication matrix is a matrix which describes the thread-to-thread communication behavior for that particular application. The communication behavior includes the communication rate, which is the amount of communication per unit of computation (which is distinct from the amount of communication per unit time). This matrix C is an $N_{threads} \times N_{threads}$ dimensional matrix, where each element $C_{ij}$ includes the communication rate between threads i and j. In some embodiments, pairs of threads with high communication rates are desired to be assigned to cores 502 and 504 near each other (or on the same tile 500) to minimize any latency. Thus, communication matrices for applications may be used to address scheduling (e.g. thread assignment issues) for the application(s).

On the processor/processing resource side, the core to core communication may not be fixed. Depending on the Linux cluster mode (e.g. all-to-all, quadrant, sub-numa cluster), the communication routing between cores can be different. In order to characterize the specific routing of a specific Linux configuration, a latency matrix L is constructed, at 606. This latency matrix L is $N_{CPU} \times N_{CPU}$. Each element $L_{ij}$ includes the communication latency between cores i and j. The latency may depend upon the number of distinct communication interactions as well as the amount of data in each interaction. A total latency estimate may be independent of the application being run, but might be defined as a function of the message sizes used by the application. In some embodiments, threads that share memory are assigned to cores with a high $L_{ij}$ latency. Thus, the latency matrix for the processors may be used to address scheduling for the cores.

As discussed above, there is a penalty for two threads to be on two cores 502 and 504 on the same tile 500. In some embodiments, it is desirable to place two threads on the same tile only if the communication between the two threads is high enough to overcome the shared computing resources bottleneck. To account for this resource contention penalty in the optimization, an additional term in the cost function is included that imposes a higher cost when two threads are assigned to cores 502 and 504 in the same tile 500. This contention cost is also determined, at 606. One way to express this is to construct a tile penalty matrix, T, which is $N_{CPU} \times N_{CPU}$. Each element in the array is the value of the incremental cost for a thread being assigned to the cores corresponding to the row and column indices. This matrix may be defined as upper (or lower) triangular, or may be defined as symmetric with the incremental cost associated with cores i and j divided between $T_{ij}$ and $T_{ji}$, for example. In the particular case of the cost associated with sharing each tile, the matrix T is sparse, and has zeros values except for entries $T_{ij}$ in which core i and CPU j are in the same tile. In some cases, the value for each non-zero entry is a constant value, SharedTileCost. In other cases, the cost for sharing a tile may differ from tile to tile. In still other cases, the penalty matrix may account for other costs associated with assignment pairings, and may accordingly have non-zero values in other elements. The value of SharedTileCost, or more generally, the value of the non-zero elements of this matrix, depends on the core architecture, and may also depend on the application. In some embodiments, 606 is analogous to part of 202 of method 200.

With those three elements related to the application, hardware and resource contention cost (the tile penalty array), a cost function may be constructed. Thus, the scheduling problem (the cost function) may be mapped to an optimization problem and resources assigned based on the solution to the optimization problem, at 608. Optimizing the cost function results in an improved assignment of threads to cores. The cost function to minimize for assigning threads to CPUs is:

$$\min_f \sum_{i,j=1}^{Nthreads} C_{ij} L_{f(i)f(j)} + \sum_{i,j=1}^{Nthreads} T_{f(i)f(j)}$$

Where f is the mapping assigning each thread to a CPU.

If $N_{threads} = N_{CPU}$, then the penalty array is constant and may not affect the optimization. However, if $N_{threads} < N_{CPU}$, then the data sharing term and the penalty array term are competing, and minimizing the cost function determines whether two threads should share a tile. This cost function may then be optimized (e.g. minimized).

The communication matrix may be obtained from a profiling software, where it can map out the thread-to-thread communication of various software applications. The latency matrix can also be obtained via a profiling software of the processor being allocated.

In some embodiments, the resource contention cost can be determined based on profiling the application as well. For example, the cache usage can be profiled via cache monitoring technology to determine whether or not two threads are competing for cache memory resources.

The solution to the optimization problem can be computed at 608. The assignment for the threads may thus be provided at 608. In some embodiments, 608 is performed using a SPOC, such as SPOC 110 and/or 310. In some embodiments, 608 may be performed with a standard CPU or on specialized hardware such as a GPU, FPGA, or custom application specific integrated circuit (ASIC). Solvers in the class of assignment solvers can be used, or more general mixed integer programming or constraint programming solvers can also be used. A custom algorithm tuned for this specific optimization problem can also be used.

Figure 7:
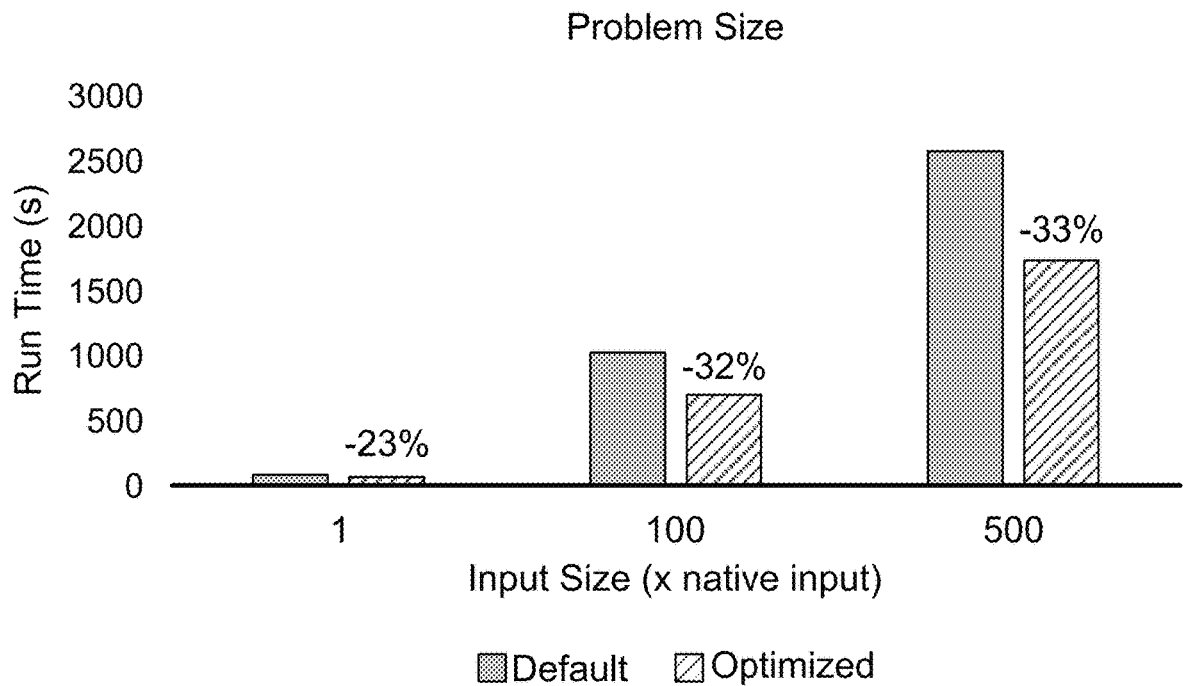
FIG. 7 indicates run time improvements as a function of input size.

Using method 600 pinning of threads, for example in processor 400 and tiles 500 may be dramatically improved. Runtime gains as much as 20% may be achieved with an optimized core pinning. The run time can also vary as a function of the input data size. Due to various issues such as synchronizing threads and memory access bottlenecks, the improvement with the core pinning can improve with input problem size. For example, FIG. 7 indicates measured run time changes as a function of input size. As indicated in FIG. 7, scheduling using an embodiment of the techniques described herein ("Optimized") may result in significantly improved runtimes over scheduling using conventional techniques such as CFS ("Default").

The techniques described herein may be applied to multiple architectures. For example, cluster optimization may be performed. The techniques described herein can be extended to assigning compute tasks to nodes in a cluster. Here a cluster is a group of computers (nodes) that work together. A node can be an individual computer or a rack of computers. In this embodiment, the application communication matrix describes the communication behavior between threads or processes of the application. The latency matrix describes the communication latency and bandwidth between cores or groups of cores in a cluster. The latency matrix may include multiple layers of latency data (e.g. core to core, socket to socket, node to node). To accelerate the optimization, assignments may be made to groups of cores rather than to individual cores. This may be suitable when there is little or no distinction between the communication latencies among cores in a group with respect to communication within that group and with respect to communication between that group and other groups. In such cases, each group may be assigned one or more threads up to a maximum number of threads for a given group, which may equal the number of cores in the group. For example, a group may consist of all cores within each node, with assignments specifying the node but not the specific core within the node. As another example, a group may consist of all cores within each socket of a node, with assignments specifying the node and socket but not the specific core within the socket. A cost function that describes other optimization tradeoffs can be used for the cluster, such as resource contention (CPU, memory), power, cloud costs, etc.

The techniques described herein may also be applied to multiple heterogeneous architectures. For example, optimization including both CPUs and GPUs in a cluster may be performed. In some such embodiments, the latency matrix describes the communication latency and bandwidth between CPUs and GPUs, both within a node and across nodes.

In another example, multiple jobs may be scheduled on a CPU or cluster at one point in time. When multiple jobs at one point in time need to be scheduled, it may be desirable to distribute the processing resources (nodes or cores) across the various tasks. In an extreme and simple example, the runtime difference for running jobs in parallel and in serial can be compared. When jobs are run in parallel, the number of cores may be divided by the number of jobs. For serial, all cores are assigned to the jobs. The runtime is far superior to run jobs in parallel than in serial.

Figure 8A:
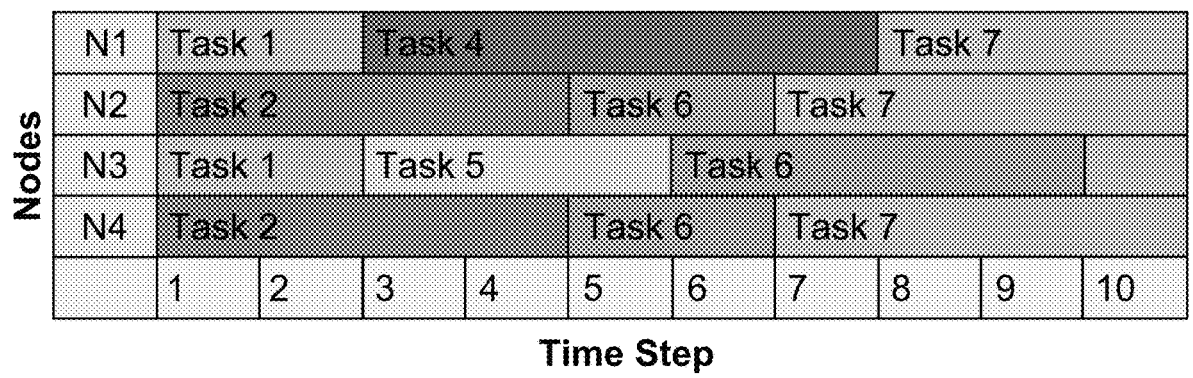

Similarly, multiple jobs can also be scheduled on a CPU or cluster over time. For cases when many jobs must be assigned over a period of time, a much more difficult optimization problem is presented. Example schedules are shown in FIGS. 8A and 8B to illustrate the point. A suboptimal scheduler may have unwanted gaps between tasks leaving compute nodes idle for various pockets of time. The core and node optimization described herein (e.g. using method 200 and/or 600) can be applied to this time-based optimization scheme, by optimizing over resource capacity, resource contention, time, and core/node pinning selection. Thus, FIG. 8A indicates a schedule in which nodes are busy with tasks throughout time step 1 through time step 10. Similarly, FIG. 8B depicts various jobs 810 (airline delay determinations, geospatial calculations, text similarity analysis and movie recommendation application) scheduled using conventional mechanisms. For each job 810, the number or cores used is shown vertically and the time the processor is working on tasks shown horizontally. The empty (white) spaces indicate the times for which a processor(s) are not busy completing tasks. For each of jobs 810 scheduled in a conventional manner (e.g. using CFS) the processors spend a significant amount time idle. In contrast, jobs 820 are scheduled using the techniques described herein. As can be seen, the cores are busy because resource allocation has been optimized. Thus, the white space representing the time cores are idle is after completion of the jobs. In some embodiments, completing the applications is on the order of eight times faster and five times cheaper than for jobs 810 allocated in a conventional manner. These gains generally increase with increases in the size and/or number of jobs. Thus, performance may be significantly improved.

Resource allocation can be optimized to update the schedule cost model. Various optimization methods utilize cost models to estimate runtime performance of tasks. Because the runtime is a function of which resources are allocated, the optimization model described above can be used to create more optimal and more accurate cost models.

Real-time monitoring may also be performed. In another embodiment, the communication matrix, contention matrix, and cost penalty matrix can be updated in real time to provide real-time optimized pinning optimization.

As discussed above, the techniques described herein may be used in the context of scheduling tasks for applications on multiple servers, for example in data centers. Thus, the methods 200 and 600 and systems 100 and/or 300 may be used in contexts other than thread-pinning. Using the techniques described herein, such as computing architectures 100 and 300 and methods 200 and 600, processing resource utilization may be improved. Computation speeds may be increased and end user cost decreased for applications including but not limited to data centers (both on-premises and in the cloud), high performance computing such as scientific simulations and machine learning, and/or other situations in which scheduling is desired. For example, in some cases, data centers may currently utilize only approximately thirty percent of their CPUs. Thus, data center computing may have increased cost (purchasing of more CPUs than required if scheduling is improved), be over-provisioned and have lower throughput. Using the improved techniques for resource allocation described herein, resources such as CPUs and memory may have increased usage. Stated differently, the data center or processor may operate more efficiently. In some cases, improved resource allocation may result in significantly reduced compute times (e.g. up to or exceeding thirty percent improvements in some cases). Similarly, in automated machine learning (AutoML) hundreds of jobs may be run in order to train a system. The hyperparameters used in AutoML are desired to be determined. The techniques described here, such as method(s) 200 and/or 600 may be applied to scheduling the jobs to improve the AutoML. Thus, the efficiency of AutoML and other applications may be improved and end user costs may be decreased. Further, data centers may use a significant portion of their processing resources in performing scheduling. For example, conventional data centers might utilize five to ten percent of available CPUs in scheduling that may still result in poor allocation of processing resources. Utilizing SPOC 110 and/or 310, these CPUs may be freed to perform other functions while allocation of processing resources is improved. Such improvements in efficiency are made possible by the ability to rapidly and efficiently allocate resources in real-time using SPOC 110 and/or 310 and method 200 and/or 600. For example, the techniques described herein may provide improved resource allocation in significantly reduced time (e.g. seconds, minutes, hours, or less).

Figure 9:
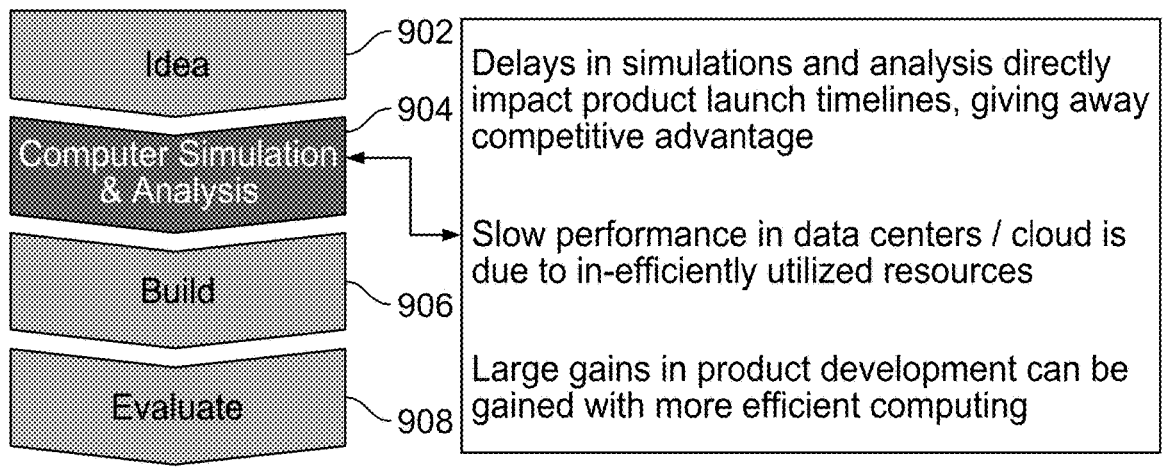
FIG. 9 depicts an embodiment of a mechanism for improving product development pipelines.

For example, FIG. 9 depicts an embodiment of a mechanism for improving product development pipelines. Use of the scheduling techniques described herein may improve the efficiency of computer simulations and analysis currently part of product development. As indicated in FIG. 9, product development may commence with an idea, at 902. A computer simulation for the idea and an accompanying analysis are performed at 904. The product may then be built at 906. The product is then evaluated, at 908. This process may be iteratively repeated to improve the product for final release. The computer simulation and analysis of 904 includes applications that may be scheduled using computing architecture 100, scheduler 101 and/or 300, and/or method(s) 200 and/or 600. Thus, improving the efficiency of processing resource allocation for such computer simulations and analysis may reduce delays, improve performance in data centers and/or the cloud and result in large reductions in product development time.

Figure 10:
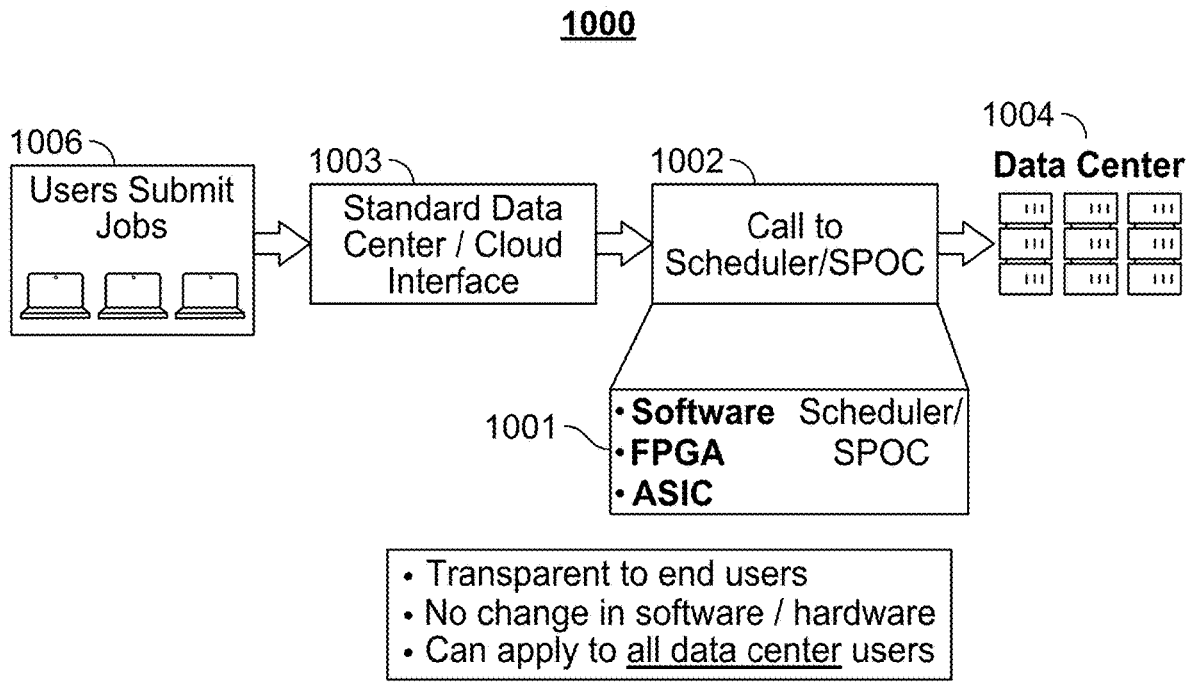
FIG. 10 depicts an embodiment of a system utilizing an embodiment of scheduler that allocates resources in the context of data centers.

FIG. 10 depicts an embodiment of a system 1000 utilizing an embodiment of scheduler that allocates resources in the context of data centers. As indicated in FIG. 10, users may submit jobs 1006 (e.g. corresponding to the applications 106 described herein). For example, jobs may be submitted via an interface 1003 available to users. The interface 1003, which may be analogous to interface 103, makes function calls 1002 to an embodiment of a scheduler 1001 that may include a SPOC that is analogous to SPOC 110 and/or 310. Thus, scheduler 1001 may be analogous to scheduler 101 and/or 300. The scheduler 1001 may utilize method 200, 600 and/or analogous methods which take into account the needs of the application(s) (i.e. the jobs 1006) as well as the processing resources available (i.e. in the data center 1004). The scheduler 1001 outputs the resources allocated for the job(s) for the data center 1004. In some embodiments, a feedback loop between the data center 1004 and the scheduler 1001 exists. Thus, the scheduler 1001 monitors the state of the resources at the data center 1004. The scheduler 1001 may update the resource allocation, for example shifting resources, as jobs change and/or resource availability changes. For example, method 200 and/or 600 may be performed multiple times in order to update resource allocation. The scheduler 1001 may utilize software and/or dedicated hardware such as SPOC 110 and/or 310 to perform the optimization that determines the resource allocation. In some embodiments, a software scheduler may be used in small scale systems and/or a small number of jobs. However, the optimization/resource allocation problem rapidly grows in size and complexity for larger numbers of jobs/applications and/or resources. In some embodiments, FPGA(s) may be used for medium or large scale systems (e.g. ten nodes through one hundred nodes). ASIC(s) may be used for larger systems (e.g. one hundred nodes through one thousand nodes, or larger). In some embodiments, the scheduler 1001 may solve the Ising model and/or the assignment problem using digital and/or analog oscillators. In some embodiments, other models may be solved using digital and/or analog oscillators.

For example, the scheduler 1001 may be used for single jobs for CPU clusters (e.g. applications including high performance computing (HPC) and accelerating compilers and code optimization); for batch/many jobs for CPU clusters (e.g. applications including cloud applications, big data, and HPC hyperparameter calculations and accelerating scheduling and resource contention), single jobs for GPU clusters (e.g. applications including machine learning training and HPC and accelerating code optimization), and/or batch/many jobs for GPU clusters (e.g. machine learning hyperparameter calculations and accelerating resource contention and scheduling).

Figure 11:
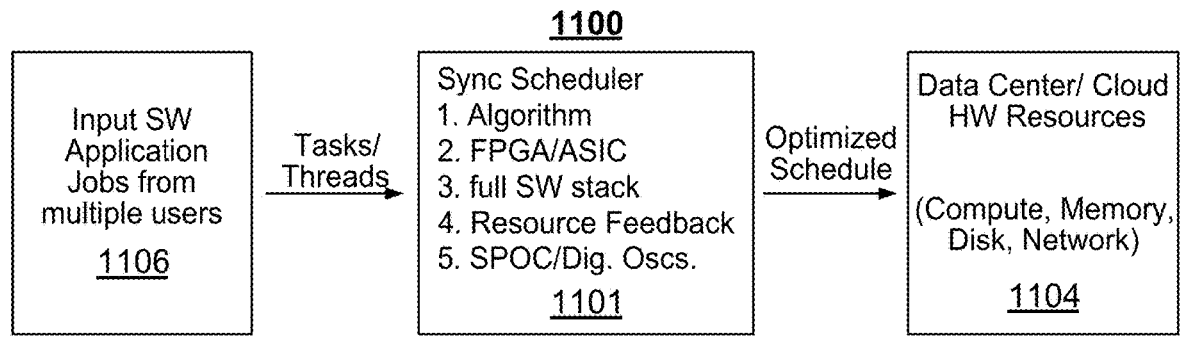
FIG. 11 depicts an embodiment of a computing system architecture utilizing a special purpose optimization processor for performing scheduling.

FIG. 11 is a block diagram depicting an embodiment of a computing architecture 1100 including scheduler 1101 as used in the context of various applications. Thus, the input provided to the scheduler 1101 may include one or more applications and jobs from one or more users. For example, the application(s) and/or jobs 1106 are scanned by the scheduler 1101 to determine tasks and/or threads, communication between the threads, other aspects of the application (s)/job(s) 1106 as well as the processing resources 1104 needed by the application(s)/job(s) 1106. The data center and/or other resources 1104 are scanned or otherwise monitored. Thus, the availability of resources, communication between resources, shared resources and other aspects of the processing resources 1104 are also determined by the scheduler 1101. The scheduler 1101 provides to the data center 1104 the optimized schedule that takes into account not only the availability of resources of the data center 1104, but also the actual needs and issues with the applications 1106. In some embodiments, the scheduler 1101 includes an application (indicated as an algorithm in FIG. 11) for scanning applications and resources and for providing the appropriate information to the SPOC/FPGA/ASIC/other hardware and/or software mechanism for optimization. The scheduler 1101 also includes an SPOC (e.g. SPOC 110 and/or 310), FPGA/ASIC or other mechanism for optimizing the scheduling (e.g. optimizing a cost function for the various threads and/or jobs). The scheduler 1101 also includes a feedback mechanism that monitors and receives feedback from the data center 1104 (e.g. what resources are currently open, what is currently in various queues, available bandwidth, etc.). In some embodiments, the feedback mechanism provides real-time feedback of the status of available hardware processing resources that enables the scheduler 1101 to make scheduling decisions dynamically and in real-time. Further, the scheduler 1101 may include a full software stack that integrates the functions of the application, hardware, and feedback mechanism of the scheduler 1101. Thus, the full software stack binds the application with the SPOC/FPGA/ASIC and/or other mechanism for optimization. The full software stack also exposes the entire stack to an external user through API(s). The optimization mechanism (e.g. FPGA, ASIC and/or other mechanism) is co-optimized with the application to take advantage of optimized parallelism and data movement. In some embodiments, the scheduler 1101 solves the problem by co-optimizing resource constraint optimization algorithms with custom hardware (e.g. the FPGA or ASIC) and software that expresses the inherent parallelism and the data movement of these algorithms in sub-ms timeframe enabling real-time, dynamic solutions.

Figure 12:
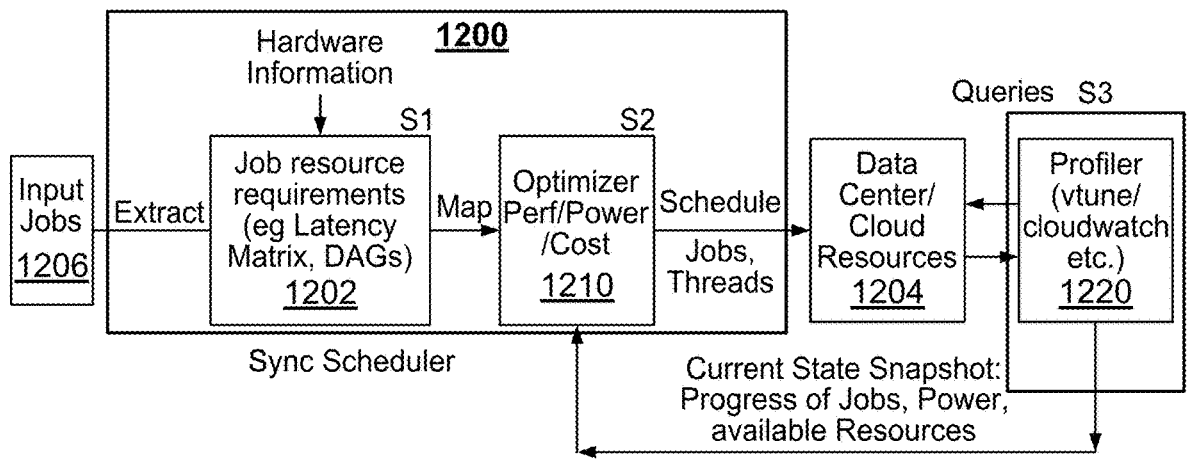
FIG. 12 depicts an embodiment of a scheduler.
Figure 13:
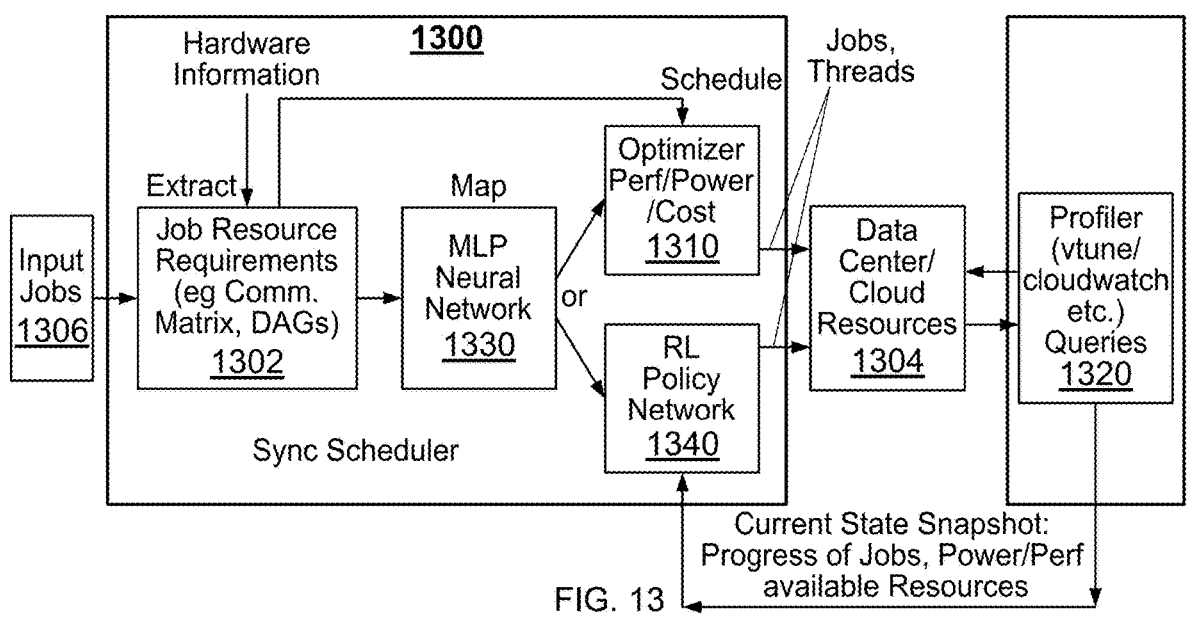
FIG. 13 depicts an embodiment of a scheduler.

FIGS. 12 and 13 depict embodiments of schedulers 1200 and 1300, respectively. Scheduler 1200 is analogous to schedulers 101 and/or 300. Input jobs 1206 and data center/cloud resources 1204 are analogous to application(s) 106 and processing resources 104, respectively. Scheduler 1200 thus includes a processor 1202 or other logic for determining the expected runtime use of computing resources ("extract" from input jobs 1206) and information related to the processing resources (hardware information) and an optimizer 1210 that may be a SPOC analogous to SPOC 110 and/or 310. Scheduler 1200 functions in an analogous manner to schedulers 101, 300, and/or 1101. Thus, the allocation or processing resources (e.g. the assignment of tasks to resources) is provided by scheduler 1200 to data center 1204. In addition, a feedback mechanism 1220 monitors the data center/cloud resources 1204 and provides information to scheduler 1200 for use in allocating and/or reallocating resources.

Scheduler 1300 of FIG. 13 is analogous to schedulers 101, 300 and/or 1200. Input jobs 1306, data center/cloud resources 1304, processor 1302, and optimizer 1310 are analogous to application(s) 106/1206, processing resources 104/1204, processor 102/302/1202 and SPOC/optimizer 110/310/1210, respectively. Feedback mechanism 1320 is analogous to feedback mechanism 1202. In addition, scheduler 1300 includes a neural network 1330 and policy network 1340. Neural network 1330 may be used to map the optimization problem to optimizer/SPOC 1301. Alternatively, policy network 1440 may be used to allocate resources for some cases.

Figure 14:
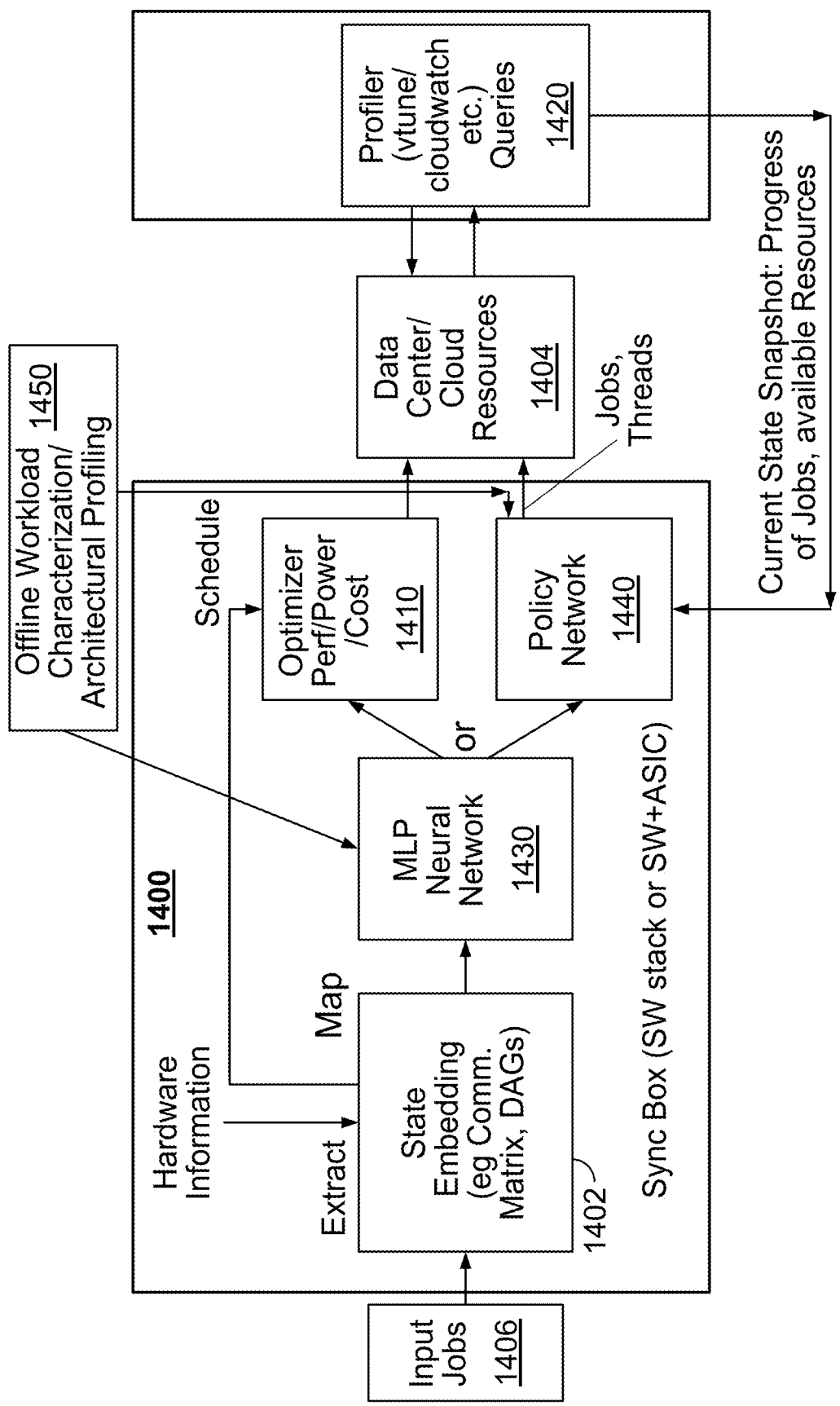
FIG. 14 depicts an embodiment of a scheduler.

FIG. 14 depicts an embodiment of a scheduler 1400 as used in the context of machine learning. Scheduler 1400 of FIG. 14 is analogous to schedulers 101, 300 and/or 1300. Input jobs 1406, data center/cloud resources 1404, optimizer 1410, neural network 1430, and policy network 1440 are analogous to application(s) 106/1306, processing resources 104/1304, SPOC/optimizer 110/310/1310, feedback 1320, neural network 1330, and policy network 1440, respectively. State embedding 1402 is analogous to processor 102 and/or 1302. In addition, offline workload characterization and architectural profiling 1450 may be used to improve scheduling for machine learning.

Figure 15:
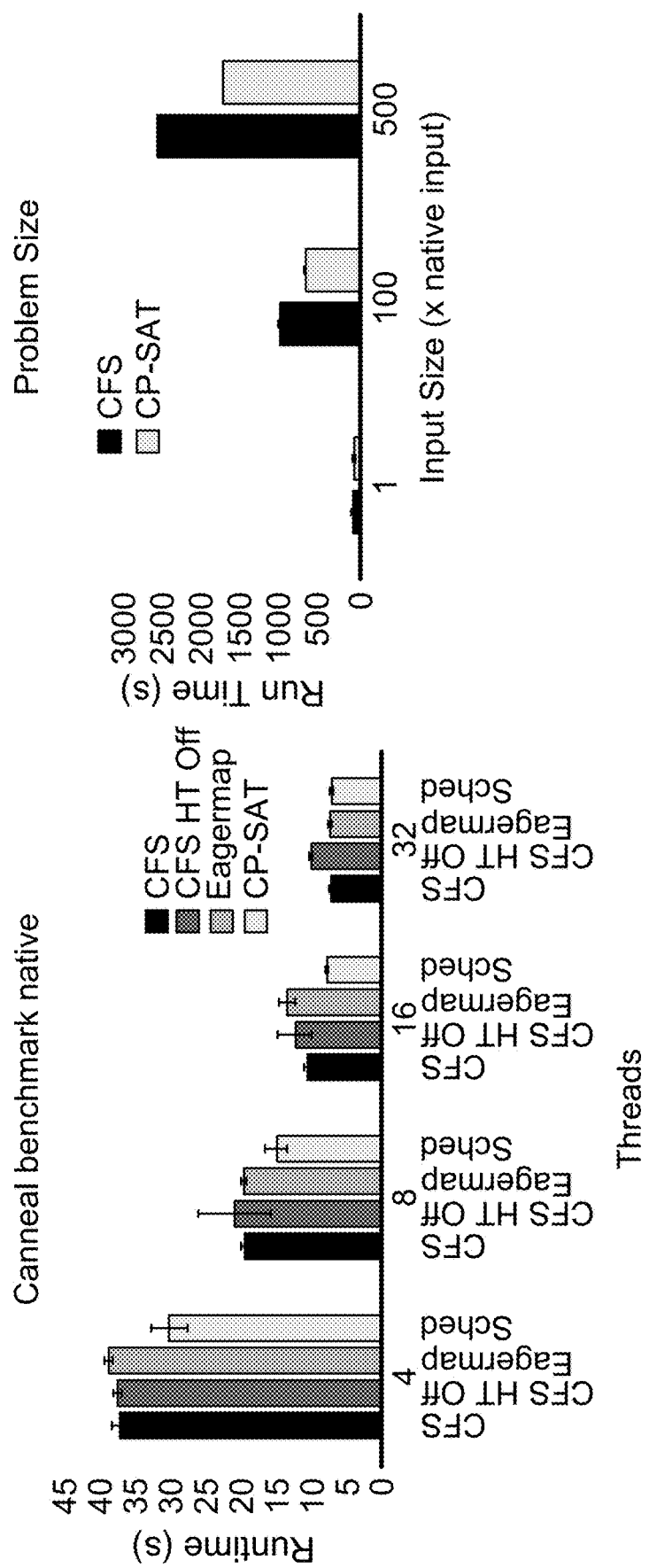
FIG. 15 is a table depicting the improvements that may be possible with an embodiment of the scheduler.

FIG. 15 depicts the improvements that may be possible for twenty physical cores using an embodiment of a scheduler (CP-SAT or Sched) versus a completely fair scheduler (CFS), a CFS scheduler with HyperThreading off (CFS HT off), and an EagerMap scheduler. As indicated in FIG. 15, the embodiment of the scheduler has reduced run time.

In other embodiments, schedulers may be configured as programmable hardware accelerators. Embodiments of such schedulers are depicted in FIGS. 16-20. Such programmable custom hardware scheduling accelerators accelerate a broad class of optimization models, such as quadratic assignment problems. The hardware scheduling accelerators may be ASIC accelerators and/or an FPGA accelerators. The hardware scheduling accelerators may speed-up a class of assignment optimization models by co-optimizing compute, data movement and data storage in the accelerator with programmable instructions. The model-accelerator co-optimization leads to reduced response time. The reduced time to provide a solution to the optimization models may provide real-time, dynamic resource allocation that is not possible using current schedulers. For large matrices, distributing the matrix operations performed to solve the optimization models into smaller programmable compute units (PCU) units (on-die or in-package chiplets) helps tackle resource allocation problems at larger scales. Thus, resource allocation for larger clusters such as data centers and/or clouds having many users as well as myriad of hardware resources; e.g. compute elements (CPU/GPU/FPGAs), memory elements (RAM, disk) and network elements (Ethernet, NVLink) may be achieved in acceptable times. Such programmable hardware accelerators may be used with or in lieu of a SPOC, such as SPOC 110 and/or 310, in some embodiments.

For example, the scheduling system may include an optimization processing unit and compute control circuitry. The optimization processing unit is configured to solve an optimization problem intended to minimize the computation time of the compute load based on a model (e.g. an optimization model) of that computation time. The optimization model corresponds to allocating hardware resources for compute tasks corresponding to application(s). The compute control circuitry is coupled with and configured to control the optimization processing unit. In some embodiments, the scheduling system also includes memory control circuitry coupled with the optimization processing unit. The optimization processing unit may include control logic, a programmable digital signal processor (DSP) math unit coupled with the control logic, and a memory coupled with the DSP math unit. In some embodiments, the optimization processing unit includes programmable compute units (PCUs). Each of the PCUs is configured to operate on a portion of the optimization model. In some embodiments, each of the PCUs is configured to operate on sub-matrices of one or more matrices. For example, the plurality of PCUs may be configured to perform an all-reduce communication and accumulation of a plurality of partial sums for the sub-matrices. In some embodiments, the PCUs may be configured to perform a central accumulation of a plurality of partial sums for the sub-matrices. The scheduling system may be integrated onto a motherboard, for example communicating with host CPU(s) via PCIe express. In some embodiments, the scheduling system includes an interposer coupling the optimization processing unit and the motherboard.

To solve the optimization model, in some embodiments, the optimization processing unit of the hardware scheduling accelerator may be configured to solve:

$$\min_f \sum_{i,j=1}^{Nthreads} C_{ij} L_{f(i)f(j)} + \sum_{i,j=1}^{Nthreads} T_{f(i)f(j)}$$

Where f may be the mapping assigning each thread to a CPU, C is a communication matrix, L is a latency matrix, T is a tile penalty (resource contention) matrix, and i and j correspond to threads. In some embodiments, the assignment f is the mapping assigning each thread to a group of CPUs. In such embodiments, each element of the latency matrix and tile penalty matrix corresponds to the value associated with the corresponding group rather than an individual CPU core. In other embodiments the optimization processing unit is configured to solve an equivalent optimization problem expressed in a different form. That form may be chosen to simplify or otherwise improve the optimization processing unit. In still other embodiments, additional terms are included in the model that correspond to other factors that affect the computational performance of the compute load as a function of the assignment.

Figure 16:
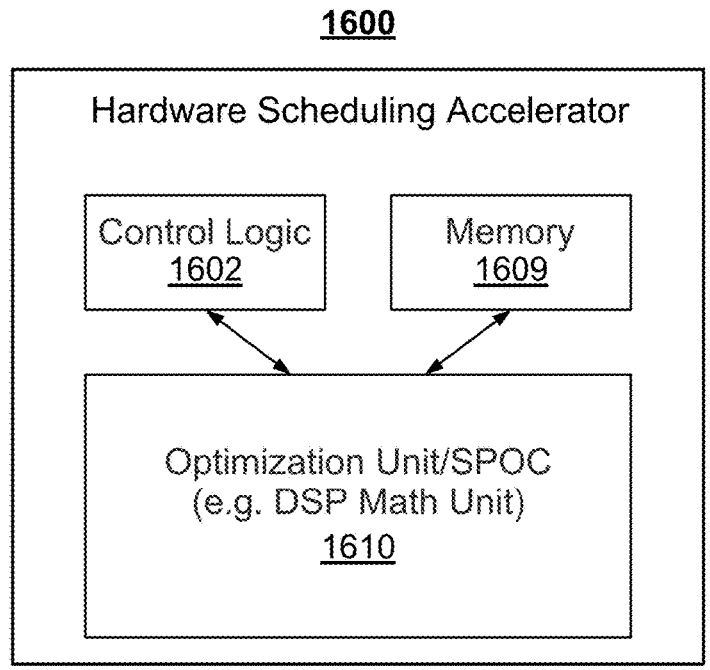
FIG. 16 depicts an embodiment of a hardware scheduling accelerator.

FIG. 16 is a block diagram depicting an embodiment of such a hardware scheduling system 1600, otherwise termed a hardware scheduling accelerator. The hardware scheduling accelerator 1600 includes an optimization unit (or SPOC) 1610, control logic 1602, and memory 1609. The optimization unit 1610 may include one or more programmable digital signal processors (DSPs) and is thus analogous to SPOC 1610. In some embodiments, other and/or additional components may be included. The hardware scheduling system is a dedicated, programmable hardware system that may perform scheduling of resources, such as compute resources, in real time or near-real time for complex systems and/or large numbers of computing tasks.

Figure 17:
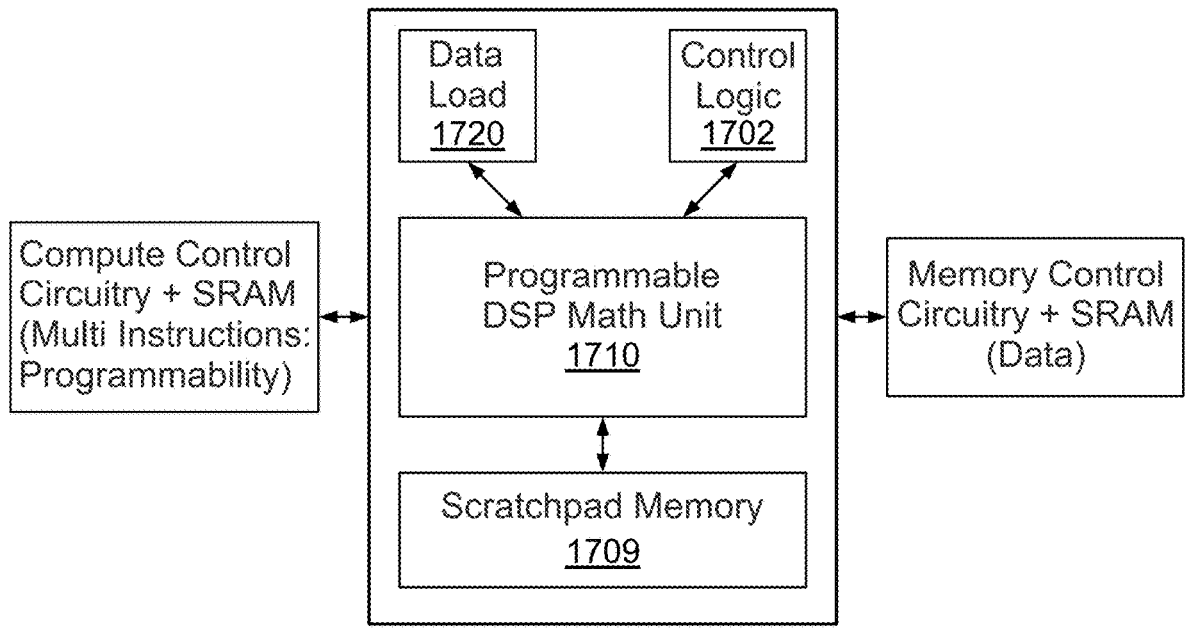
FIG. 17 depicts an embodiment of a portion of a hardware scheduling accelerator.

The hardware scheduling accelerator may include one or more programmable compute unit (PCU) chiplets (termed a PCU, a PCU chiplet or a chiplet). One embodiment of such a PCU 1700 for use in a hardware scheduling accelerator is shown in FIG. 17. The PCU 1700 includes programmable math unit 1710, control logic 1702, data load 1720, and memory 1709. In some embodiments, a hardware scheduling accelerator includes multiple PCU chiplets connected in a network-on-chip (NoC) architecture+in-package CPU and high bandwidth memory (HBM) for solving assignment problems and/or other optimization models. For example, the PCU(s) may be configured to solve the quadratic assignment problem (QAP) formulation. An example of matrices involved in solving the QAP are a latency matrix $L_{ij}$ ($N_{core} \times N_{core}$) and a communication matrix $C_{ij}$ ($N_{thread} \times N_{thread}$). In such embodiments, the cores are the hardware resources and the threads are the application software interacting threads. A contention penalty array, T, along with the latency and communication matrices, form the objective function to be minimized. In one embodiment, these matrices and the vector are stored on the 2.5D packaged HBM and brought onto the PCU chiplets for computation. In such an embodiment, the PCU is configured to solve:

$$\min_f \sum_{i,j=1}^{Nthreads} C_{ij} L_{f(i)f(j)} + \sum_{i,j=1}^{Nthreads} T_{f(i)f(j)}$$

Some mathematical operations performed for solving the QAP include manipulating the matrices by summing the changes over the product of the row and column of each of the two matrices. The compute and the data, memory accesses of this mathematical operation for multiple implementations of the QAP formulation are mapped onto the programmable hardware. The matrices can be used in their full form (e.g. for smaller matrices) or can be distributed over multiple PCU units for very large matrix sizes.

Full communication and latency matrices may be maintained in some embodiments. In the case of continuous real-time operations with monitoring, the communication matrix and the contention penalty vector are updated in real-time based on monitoring data. For example, monitoring data from tools may be used. The elements of these matrices may be updated/written in the HBM and then placed on the SRAM Data Cache of the PCU die. However, the latency matrix once loaded, may remain on the PCU die because the latency matrix is generally not updated. In some embodiments, the on-die data cache is large enough to store the latency matrix. For example, for the number of cores ($N_{Core}$) in the range of thousands, the size of the on-die data cache may be from the GB range to in the 10s of MBs to hold the latency matrix.

Figure 18:
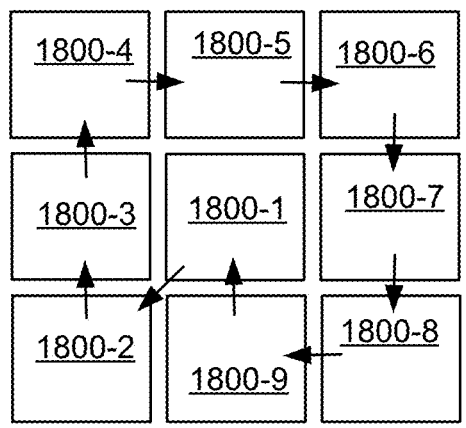
FIGS. 18-19 depict embodiments of mechanisms for accumulating sums in a hardware scheduling accelerator.
Figure 19:
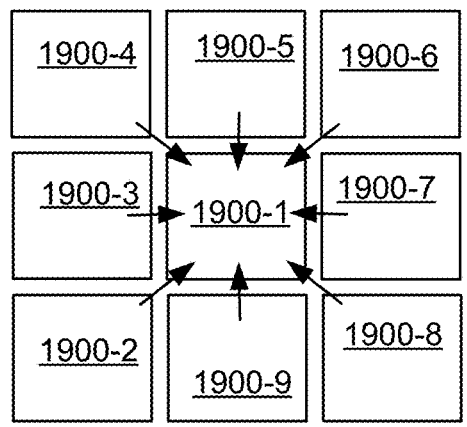

In some embodiments, the communication and/or latency matrix may be distributed. In such embodiments, the communication and/or latency matrices are broken up and distributed to multiple PCUs. Block diagrams of two such embodiments are shown in FIG. 18 and FIG. 19. FIG. 18 depicts PCUs 1800-1, 1800-2, 1800-3, 1800-4, 1800-5, 1800-6, 1800-7, 1800-2 and 1800-9 (collectively or generically PCU(s) 1800). FIG. 19 depicts PCUs 1900-1, 1900-2, 1900-3, 1900-4, 1900-5, 1900-6, 1900-7, 1900-2 and 1900-9 (collectively or generically PCU(s) 1900). In the case of distributed computing, partial sums (instead of solving the entire full matrices in one shot) are computed in each PCUs 1800 and/or 1900. These embodiments utilize more registers in the programmable DSP units. The communication and latency submatrices may be provided to the PCUs 1800 and 1900. In the embodiment depicted in FIG. 18, partial sums are collected and summed up from all PCUs 1800 in an Allreduce fashion (as indicated in FIG. 18 by the arrows showing circulation through PCUs 1800-1, 1800-2, 1800-3, 1800-4, 1800-5, 1800-6, 1800-7, 1800-2 and 1800-9). In the embodiment depicted in FIG. 19, partial sums are collected and accumulated in a central PCU 1900-1 (as indicated in FIG. 19 by the arrows showing convergence to PCU 1900-1 from PCUs 1900-2, 1900-3, 1900-4, 1900-5, 1900-6, 1900-7, 1900-2 and 1900-9). For example, the stored register values of the partial sums may be cumulatively updated along PCUs 1800 or 1900. To facilitate both kinds of final summation, broadcast (global) and unicast (local) communications may be engineered using global and local interconnects connecting the PCUs. In some embodiments, the PCU(s) 1800 and/or 1900 may be provided on a motherboard, for example via an interposer.

Figure 20:
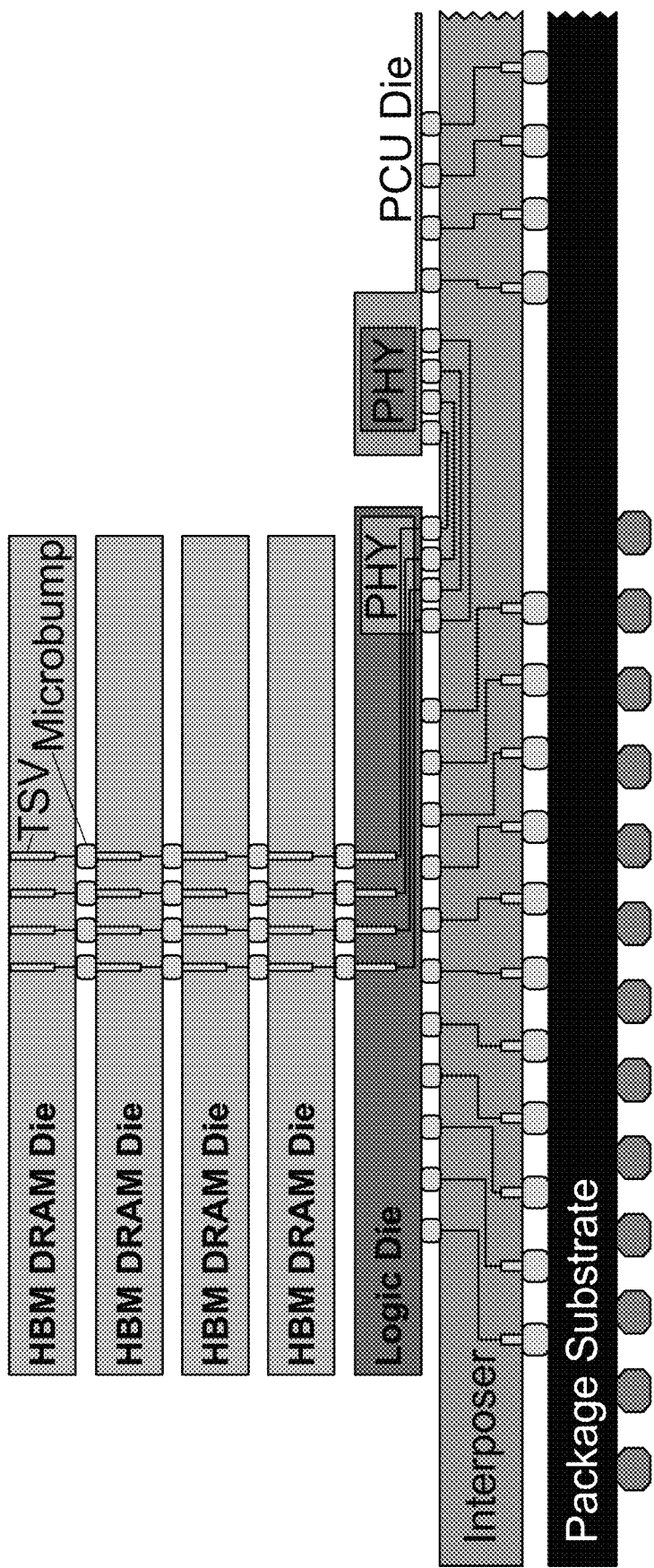
FIG. 20 depicts an embodiment of a portion of hardware scheduling accelerator.

FIG. 20 depicts an embodiment of a PCU with HBM for storing large matrices and usable in QAP as utilized on a motherboard. In some embodiments, programmable DSP math units are utilized. Programmability is a feature of such a hardware scheduling accelerator 1600 because the accelerator tracks the evolution of solution techniques, as new and better techniques emerge. In some embodiments, a separate program cache and data cache are utilized. Separate program and data caches allow fetching of instructions and access to data simultaneously. In some embodiments, both the program and data caches are configured as SRAMs. However, the SRAM Data cache is much larger in size than the multi-instruction SRAM cache in some embodiments. In some embodiments, the programmable DSP receives the instructions that account for programmability. Instructions may be for the computation controller, communication controller and programmable DSP in some embodiments. The programmable DSP may include three pipeline stages: add/subtract, multiply/divide, and fixed functions (e.g. ALU). In some embodiments, the programmable DSP consists of these three stages. In addition, a program counter controls the instruction level of the pipeline. Thus, the instruction level of the pipeline may be programmable and may be a variable depending on the algorithm. In some embodiments, other types of chips (e.g. CPU/GPU/FPGA) can be connected to the PCU. Reduced and variable bit width operation (e.g. an eight bit width multiply and a sixteen bit width accumulation) may be used because precise floating point values may be less relevant. Further, relative cost comparisons may be more important for the underlying models. In some embodiments, the entire PCU is an interposer-based 2.5D package. In some embodiments, the PCU may be a 3D package. The other hardware components are also connected to the PCU via the interposer. DRAM may also be 2.5D packaged via the interposer. The DRAM may be a high bandwidth (HBM) version with multiple layers of DRAM die stacked through TSVs to form the main memory where the matrices are stored. Matrices may be stored in full or sparse format in the HBM. Expected speed gains may be achieved from faster data transfer from HBM to PCU, curated instructions for the class of quadratic assignment problems, and efficient math operations using the programmable DSP. This may provide an optimized solution very quickly. As a result, dynamic, real-time resource allocation may be achieved. Dealing with large matrices may be facilitated by breaking up the problem and distributing the matrix math between multiple PCUs and collecting and ultimately gathering the partial sums of products of the distributed sub-matrices. Multiple PCUs may be provided on the same large die or may be packaged as chiplets into one large SoC.

Thus, some embodiments of schedulers may use the hardware scheduling accelerator described herein. Large and/or complex scheduling problems may be more efficiently handled. As a result, real-time or near real-time scheduling may be achieved for large numbers of tasks and/or a large amount of resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of assigning processing resources, comprising: receiving an application; analyzing the application to determine an expected run time use of the processing resources; and assigning at least a portion of the processing resources to the application based on the expected run time use of the processing resources;
   wherein the processing resources include a plurality of servers and wherein the analyzing the processing resources further includes: determining a plurality of latencies within each of the plurality of servers and between the plurality of servers; determining resource contention costs for each of the plurality of servers; and wherein the assigning is based on the plurality of latencies and the resource contention costs;
   wherein the analyzing includes mapping the expected run time use of the processing resources to an optimization problem; and wherein the assigning the at least the portion of the processing resources uses a dedicated optimization coprocessor that receives the mapping of the expected run time use of the processing resources and outputs a solution to the optimization problem, the solution corresponding to an assignment of the at least the portion of the processing resources.

2. The method of claim 1, wherein the application includes a plurality of tasks and wherein the analyzing the application further includes: determining a number of the plurality of tasks; determining an order of the plurality of tasks; and determining an information transfer between tasks in the plurality of tasks.

3. The method of claim 1, wherein the receiving the application further includes: receiving a plurality of applications; wherein the analyzing the application further includes analyzing the plurality of applications to determine the expected run time use of the processing resources for each application of the plurality of applications; and wherein the assigning further includes assigning the at least the portion of the processing resources to each application based on the expected run time use of the processing resources for each application.

4. The method of claim 1, further comprising: analyzing the processing resources; and wherein the assigning further assigns the at least the portion of the processing resources to the application based on the analyzing of the processing resources.

5. The method of claim 4, wherein the processing resources include a plurality of cores and wherein the analyzing the processing resources further includes: determining a plurality of latencies between the plurality of cores; determining resource contention costs for each of the plurality of cores; and wherein the assigning is based on the plurality of latencies and the resource contention costs.

6. A computing system architecture comprising:
   a processing resource pool including a plurality of servers;
   an interface for receiving an application to be executed; and
   a special purpose optimization coprocessor that receives information about the application and the processing resource pool and outputs an allocation scheme for allocating tasks of the application to the processing resource pool;
   wherein the application is analyzed to determine an expected run time use of the processing resource pool by the application, wherein the expected run time use of the processing resource pool is mapped to an optimization problem; and wherein the at least the portion of the processing resources is assigned using a dedicated optimization coprocessor that receives the mapping of the expected run time use of the processing resource pool and outputs a solution to the optimization problem, the solution corresponding to an assignment of the at least the portion of the processing resource pool;
   wherein analyzing the processing resource pool further includes: determining a plurality of latencies within each of the plurality of servers and between the plurality of servers; determining resource contention costs for each of the plurality of servers; and wherein assigning the at least the portion of the processing resources is based on the plurality of latencies and the resource contention costs.

7. The computing system architecture of claim 6, wherein the special purpose optimization coprocessor further includes: a plurality of digital oscillators; and at least one programmable interconnect configured to provide weights for and to selectably couple at least a portion of the plurality of digital oscillators.

8. The computing system architecture of claim 6, further comprising: a processor configured to: analyze the application to determine an expected run time use of the processing resource pool; and wherein the information received by the special purpose optimization coprocessor further includes the expected run time use of the processing resource pool.

9. The computing system architecture of claim 8, wherein to analyze the application, the processor is configured to: determine a number of the tasks; determine an order of the tasks; and determine an information transfer between the tasks; and wherein the expected run time use of the processing resource pool includes the number of the tasks, the order of the tasks and the information transfer between the tasks.

10. The computing system architecture of claim 8 wherein the processor is further configured to: map the information about the application and the processing resource pool to an optimization problem.

11. The computing system architecture of claim 6, wherein the interface further receives a plurality of applications; and wherein the allocation scheme output by the special purpose optimization coprocessor allocates the tasks of each of the plurality of applications to the processing resource pool.

12. The computing system architecture of claim 11, wherein the interface receives the plurality of applications in a time interval; and wherein the special purpose optimization coprocessor continuously updates the allocation scheme in the time interval.

13. The computing system architecture of claim 11, wherein the interface receives the plurality of applications in a time interval; and wherein the special purpose optimization coprocessor outputs the allocation scheme for the plurality of applications received in the time interval.

14. The computing system architecture of claim 6, wherein the processing resource pool includes a plurality of cores; and wherein the special purpose optimization coprocessor further outputs the allocation scheme based on a plurality of latencies between the plurality of cores and resource contention costs for each of the plurality of cores.

15. The computing system architecture of claim 6, wherein the processing resource pool includes a plurality of servers; and wherein the special purpose optimization coprocessor further outputs the allocation scheme based on a plurality of latencies within each of the plurality of servers and between the plurality of servers and based on resource contention costs for each of the plurality of servers.

16. A computer program product embodied in a non-transitory computer readable medium and comprising computer instructions for: receiving an application; analyzing the application to determine an expected run time use of a processing resource pool by the application; providing, to a special purpose optimization coprocessor, information about the expected run time use of the processing resource pool, the special purpose optimization coprocessor outputting an allocation scheme for allocating tasks of the application to the processing resource pool based on the expected runtime use of the processing resource pool; and
   assigning the tasks of the application using the allocation scheme;
   wherein the processing resources include a plurality of servers and wherein the analyzing the processing resources further includes: determining a plurality of latencies within each of the plurality of servers and between the plurality of servers; determining resource contention costs for each of the plurality of servers; and wherein the assigning is based on the plurality of latencies and the resource contention costs
   wherein the analyzing further includes mapping the expected run time use of the processing resources pool to an optimization problem;
   and wherein the assigning the at least the portion of the processing resources uses a dedicated optimization coprocessor that receives the mapping of the expected run time use of the processing resources and outputs a solution to the optimization problem, the solution corresponding to an assignment of the at least the portion of the processing resources.

17. The computer program product of claim 16, wherein the computer instructions for receiving the application further include computer instructions for: receiving a plurality of applications; wherein the computer instructions for analyzing the application further include computer instructions for analyzing the plurality of applications to determine the expected run time use of the processing resource pool for each the plurality of applications; wherein computer instructions for providing the information further include computer instructions for providing to the special purpose optimization coprocessor the expected runtime use of the processing resource pool for each of the plurality of applications, the allocation scheme allocates the tasks of each of the plurality of applications to the processing resource pool based on the expected runtime use for each of the plurality of applications; and wherein the computer instructions for assigning the tasks further include computer instructions for assigning the tasks of each of the plurality of the applications using the allocation scheme.

18. The computer program product of claim 16, further comprising: wherein the processing resource pool includes a plurality of cores in a server and memory resources for the plurality of cores.

\* \* \* \* \*